(12) United States Patent
Kennedy

(10) Patent No.: US 9,107,135 B1
(45) Date of Patent: Aug. 11, 2015

(54) UNIVERSAL COMMUNICATIONS SYSTEM FOR INITIATING DIRECTED TELECOMMUNICATIONS CAMPAIGN

(75) Inventor: James Lehr Kennedy, Columbus, OH (US)

(73) Assignee: West Notifications, Inc., Omaha, NE (US)

( * ) Notice: Subject to any disclaimer, the term of this patent is extended or adjusted under 35 U.S.C. 154(b) by 231 days.

(21) Appl. No.: 13/034,445

(22) Filed: Feb. 24, 2011

Related U.S. Application Data

(60) Provisional application No. 61/307,512, filed on Feb. 24, 2010.

(51) Int. Cl.
*H04W 16/22* (2009.01)
*H04W 36/30* (2009.01)

(52) U.S. Cl.
CPC .............. *H04W 36/30* (2013.01); *H04W 16/22* (2013.01)

(58) Field of Classification Search
CPC ........... H04W 4/22; H04W 4/00; H04W 4/02; H04W 16/22
USPC .............. 455/404.1, 404.2, 414.1, 456.1, 566
See application file for complete search history.

(56) References Cited

U.S. PATENT DOCUMENTS

| | | | |
|---|---|---|---|
| 6,975,876 B1* | 12/2005 | Cast et al. ...................... | 455/466 |
| 8,032,151 B2 | 10/2011 | Paulson et al. | |
| 2007/0275690 A1* | 11/2007 | Hunter et al. .............. | 455/404.2 |
| 2008/0242312 A1* | 10/2008 | Paulson et al. ............. | 455/456.1 |
| 2009/0100509 A1 | 4/2009 | Wolfsberger | |
| 2009/0318110 A1* | 12/2009 | Zarefoss .................... | 455/404.2 |
| 2010/0069035 A1* | 3/2010 | Johnson ..................... | 455/404.1 |

* cited by examiner

*Primary Examiner* — Myron K Wyche

(57) ABSTRACT

The invention disclosed is a new system and method for directing the initiation of a notification campaign directed to a telecommunications system, wherein a variety of different campaigns are initiated through a universal interface offering access to a variety of telecommunications systems. With the advent of automated telephonic message delivery, certain public safety agencies, such as police departments and fire departments, seek to deliver mass messages to citizenry at risk during emergency situations.

20 Claims, 27 Drawing Sheets

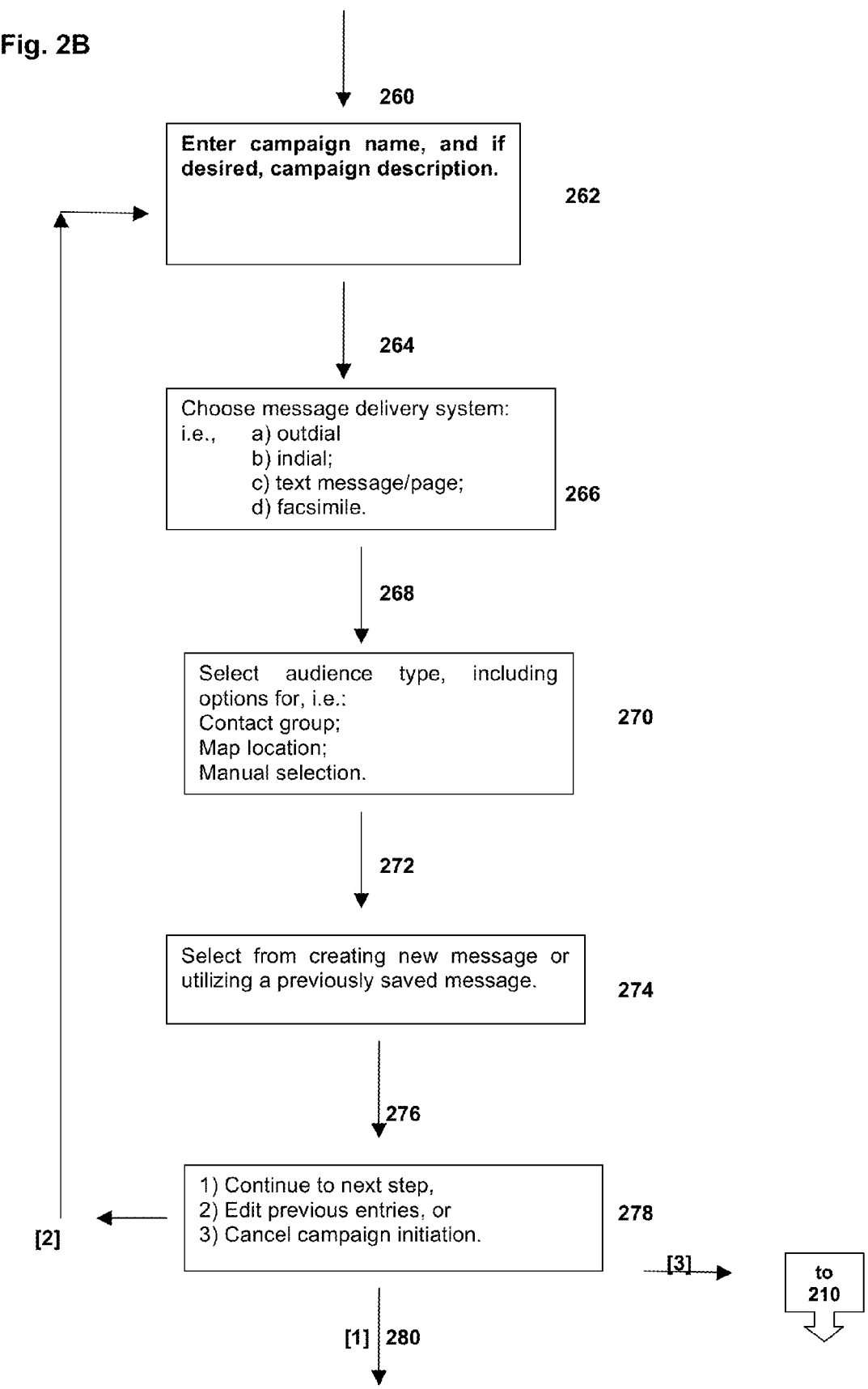

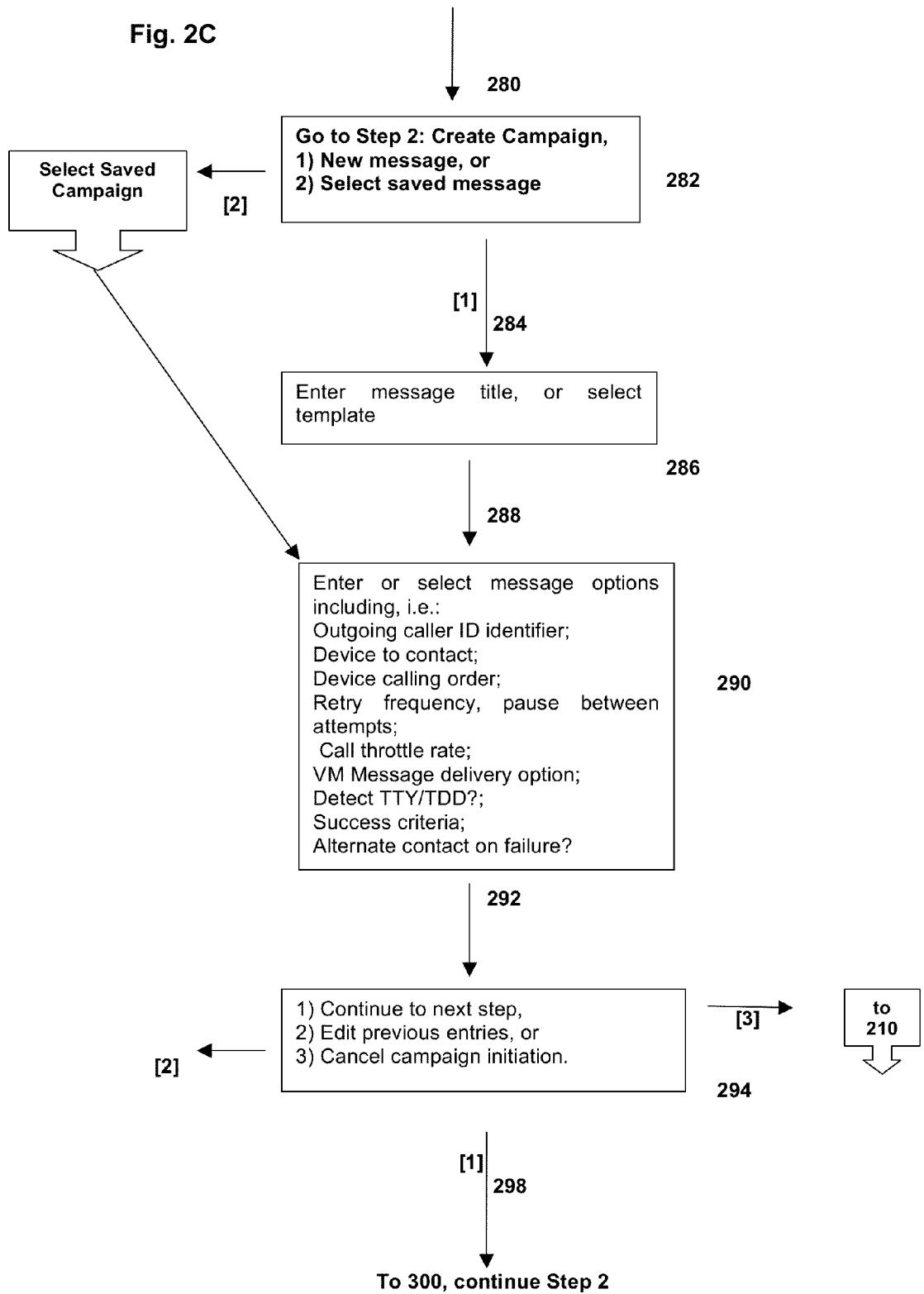

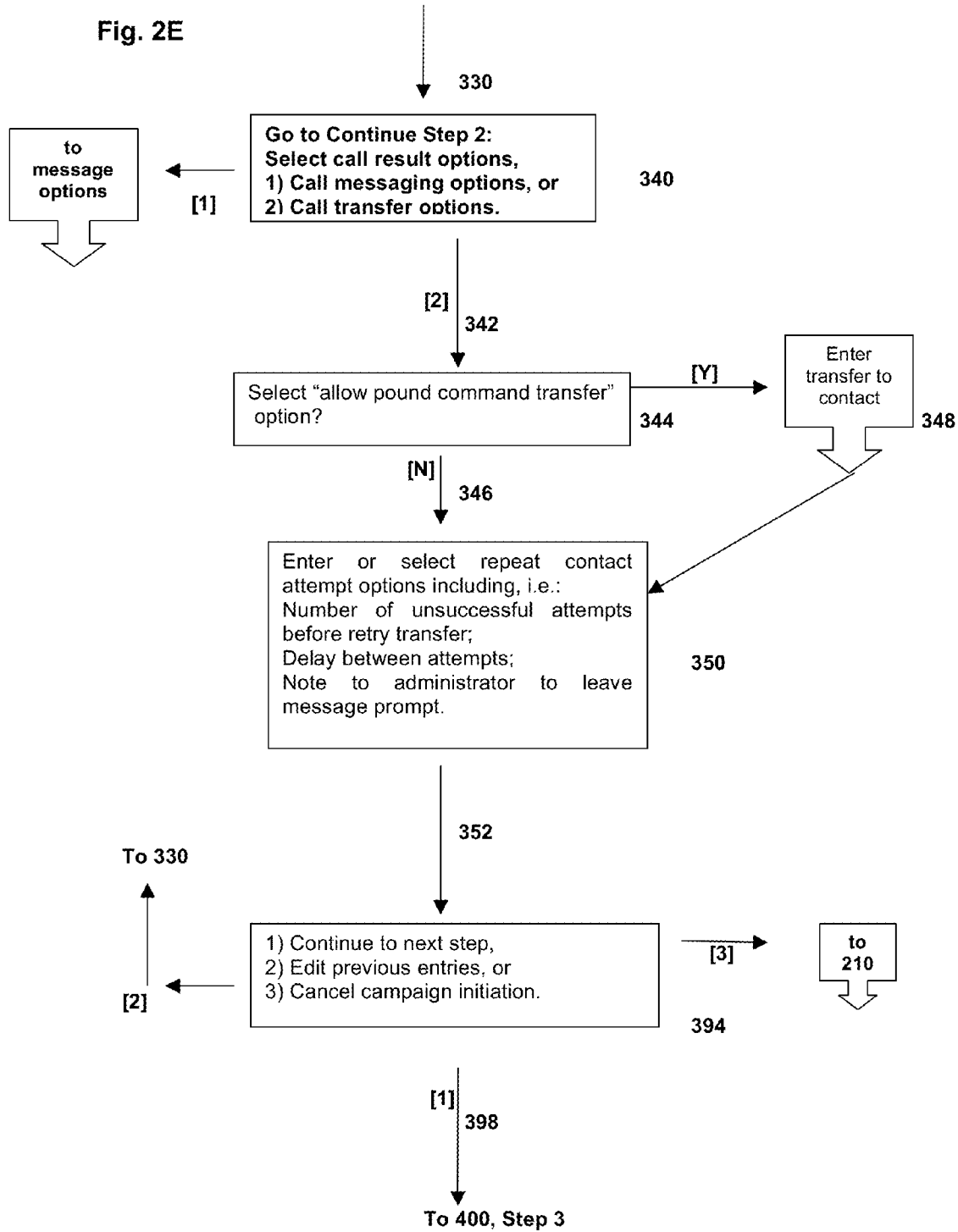

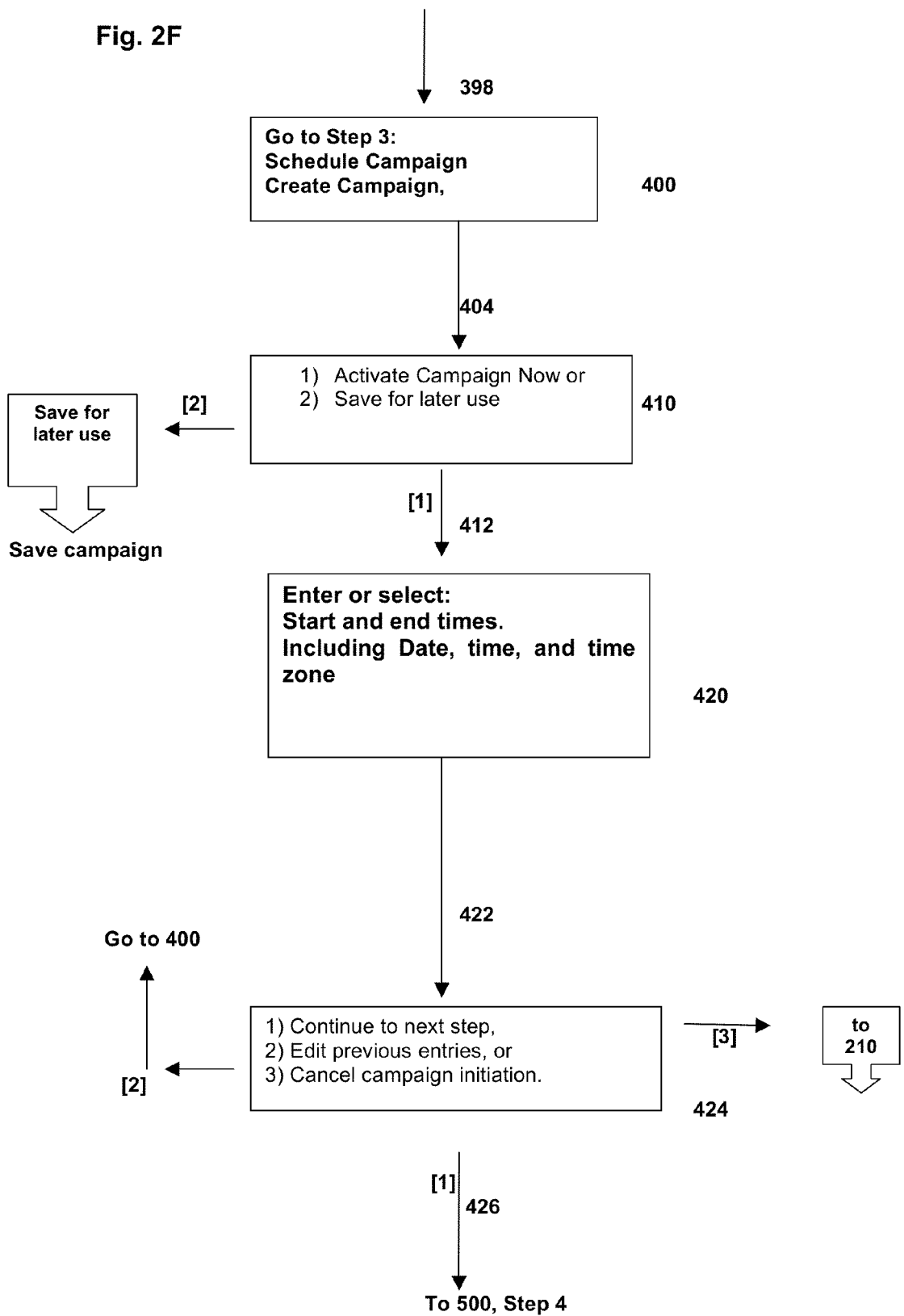

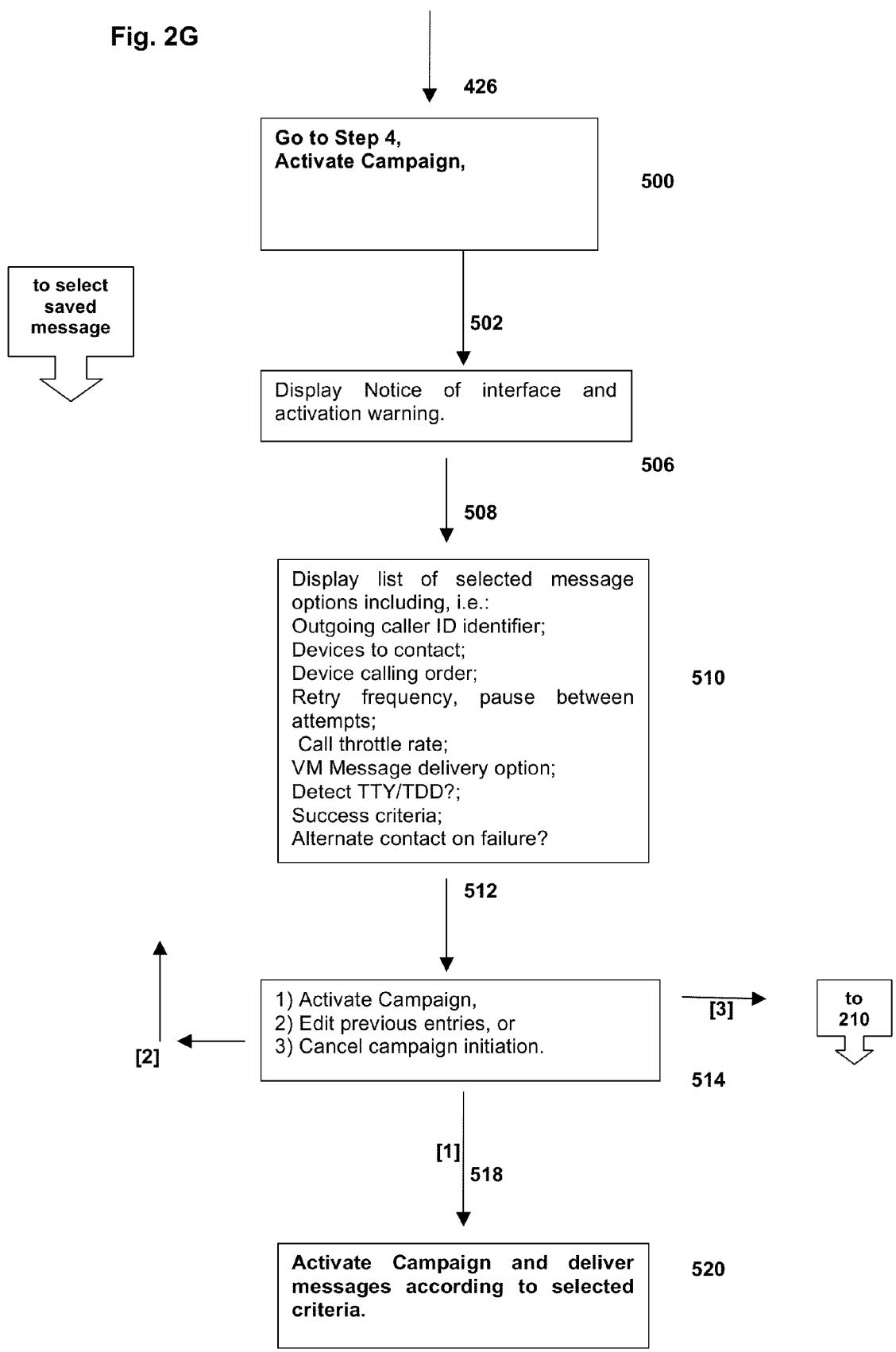

Radius

UNIVERSAL COMMUNICATIONS SYSTEM FOR INITIATING DIRECTED TELECOMMUNICATIONS CAMPAIGN

CROSS-REFERENCE TO RELATED APPLICATIONS

This application claims priority to U.S. Provisional Application Ser. No. 61/307,512 filed Feb. 24, 2010, the disclosure of which is hereby incorporated by reference.

STATEMENT REGARDING FEDERALLY SPONSORED RESEARCH

None

BACKGROUND OF THE INVENTION

The present invention generally relates to a system for allowing the initiation of a notification campaign directed to a telecommunications system, wherein a variety of different campaigns are initiated through a universal interface offering access to a variety of telecommunications systems. With the advent of automated telephonic message delivery, certain public safety agencies, such as police departments and fire departments, seek to deliver mass messages to citizenry at risk during emergency situations.

On many occasions, a variety of agencies, whether governmental, quasi-governmental, public utilities, or private companies, have the need to deliver messages through telecommunications systems. For instance, a governmental agency may wish to notify certain households of the threat of a natural disaster, such as a wildfire or a hurricane. The agency may initiate a crisis notification system that delivers either a telephone message or records a telephone message on the answering machine of households that are at risk. Similarly, citizens may provide their cellular telephone contact information, for instance, and request the delivery of a text message or email.

Continuing problems in the delivery of mass notification messages are the variety of telecommunications platforms utilized by the population within a given area, language barriers, and differences between closely associated groups in the relative danger presented. These deficiencies all lead to a limited ability to deliver relevant emergency messages in a timely manner. In addition, the emergency itself and or the number of contacts to be initiated may result in over utilization of available telecommunications capacity.

Other continuing problems with effectively initiating and delivering mass emergency notifications is the unwieldy nature of successfully completing the steps necessary to set up a telecommunications campaign with short notice, and during periods of stress for the agent initiating the campaign. In many cases the agent responsible will be relatively inexperienced in initiating emergency notifications, and learning the use of an unfamiliar system during periods of stress or emergency may limit the effectiveness in initiating a notification campaign. In emergency notification situations, successful delivery of messages is critical, as delivery failures during crises that may lead to unnecessary property damage, injury or even death.

Existing systems for mass message emergency notification do not provide for geographic selection of target contacts. An example of an existing system with such limitations is disclosed in U.S. Publication No. US 2009/0100509 A1.

There exists an acute need for a system and method that would allow various agencies to rapidly initiate emergency notifications for populations with diverse telecommunications connections, diverse individual characteristics, and in a variety of geographic regimes. The successful delivery of emergency notification can be enhanced by providing the initiating agent with a variety of intuitive tools to increase the probability that messages are successfully delivered. If a system for providing rapidly initiated and effectively targeted emergency notifications were available, the safety of the general public could be more efficiently provided.

BRIEF DESCRIPTION OF THE DRAWINGS

For a fuller understanding of the nature and advantages of the present invention, reference should be had to the following detailed description taken in connection with the accompanying drawings, in which:

FIG. 2A-G shows an overview of the TTY detection and message delivery system;

FIG. 3A-F show samples of interface screens that can be utilized as the system interface for initiating a notification campaign;

DETAILED DESCRIPTION OF THE INVENTION

Disclosed herein is a new system and method for providing a universal communications system that allows for the efficient initiation of a telecommunications campaign and subsequently delivering a telecommunications messages to a variety of platforms.

A number of systems exist for providing crisis communications on behalf of a number of governmental and non-governmental entities such as police departments and utilities (i.e. agencies). The delivery of emergency notifications is often limited by the inability to assure efficient delivery of messages, and delay in initiating emergency notification campaigns. The new system and method reduces the time necessary for an administrator to initiate an emergency notification campaign, and also increases the efficiency through which emergency notifications are delivered.

Figure 1:
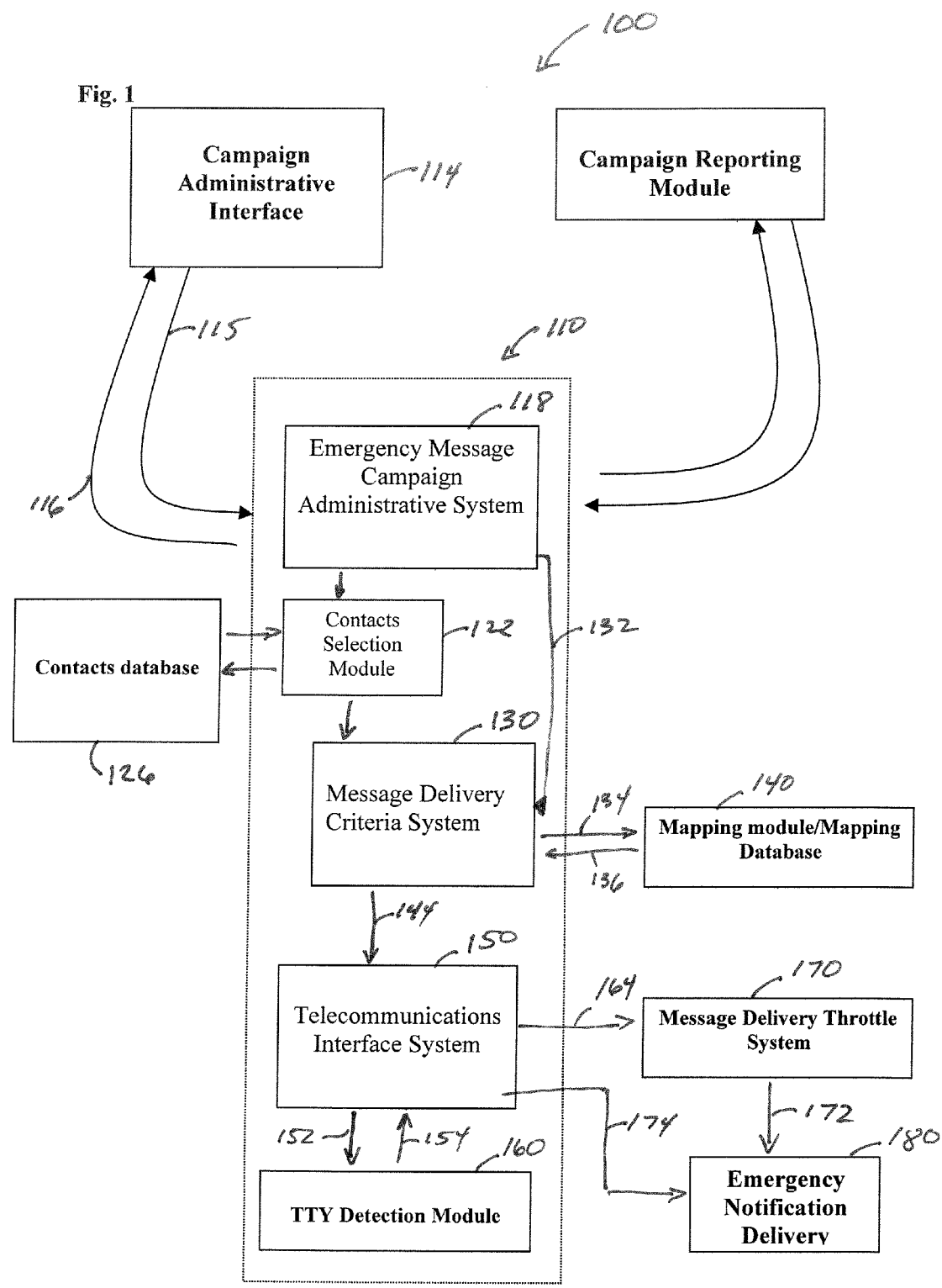
FIG. 1 shows an overview of the emergency notification message delivery system.

FIG. 1 shows the outline of the new system. Emergency Message Campaign control system 110 is configured by a campaign administrator acting through a campaign administrative interface 114. The administrator thus configures Emergency Message Campaign Administrative System 118. One aspect of the configuration of the system is the contacts selection module 122, allowing the selection of a subset of the potential contacts to receive delivery of an emergency message. Contacts selection module 122 interacts with contacts database 126, with contacts database 126 containing a multitude of telecommunications contacts, which may at some point be selected for delivery of a notification. Contacts database 126 may be maintained either as part of the emergency notifications system, or by a third party, such as a public safety agency, by a utility, or by a governmental entity. The message delivery criteria system 130 allows for the administrator to select a number of call delivery criteria, including for instance, redial frequency, success criteria, voicemail message delivery, calling order, and the like. Such criteria are further disclosed in relation to FIGS. 2 and 3. One criteria integrated by the message delivery criteria system is message delivery dependent on destination geographic location. When a geographic criteria is selected by the administrative system via arrow 132, criteria system 130 queries mapping module/mapping database 140 via arrow 134, with the responsive information delivered via arrow 136, allowing for selection of message delivery to a discreet geographic area, for instance. Telecommunications interface system 150 allows for the delivery of messages to a variety of telecommunications systems, such as voice, VOIP, text, email, facsimile, and pages. Interface system 150 utilizes information delivered via arrow 144 to attempt delivery to the proper or chosen telecommunications interface. One optional message delivery system utilizes TTY detection module 160. The system is configurable to communicate with a TTY device; the provider of the emergency message utilizing the TTY delivery capability creates both a voice and a text message. When TTY detection module 160 is enabled, telecommunications interface 150 is configured to query the interface for the detection of a TTY device, via arrow 152. If such a device is detected by module 160, a response is delivered to interface system 150 through arrow 154. Thus, the telecommunications interface system is signaled to deliver a TTY compatible message. If a TTY is not detected, as signaled by arrow 154, then a non-TTY message, as specified by module 130, is delivered.

Telecommunications interface system 150 then attempts delivery of messages associated with the selected emergency notification campaign, as shown by arrow 164. An optional feature of the new system and method is utilization of a message delivery throttling system 170. The message delivery throttling system is capable of regulating the rate at which emergency notifications are delivered to the connected telecommunications system. In certain situations, wherein there is limited telecommunications capacity, or where the existing capacity is overloaded by other calls, (such as from panicked citizenry), the throttling system delivers the messages at a rate configured to enhance the probability that messages will be successfully delivered to the intended recipients. If the message throttling system 170 is active, the rate of call delivery is regulated, and emergency message delivery 180 is attempted to the intended recipients as represented by arrow 172. If the message throttling system 170 is inactive and the rate of call delivery is not specifically regulated, emergency message delivery 180 is attempted to the intended recipients as quickly as possible, as represented by arrow 174.

Figure 2A:
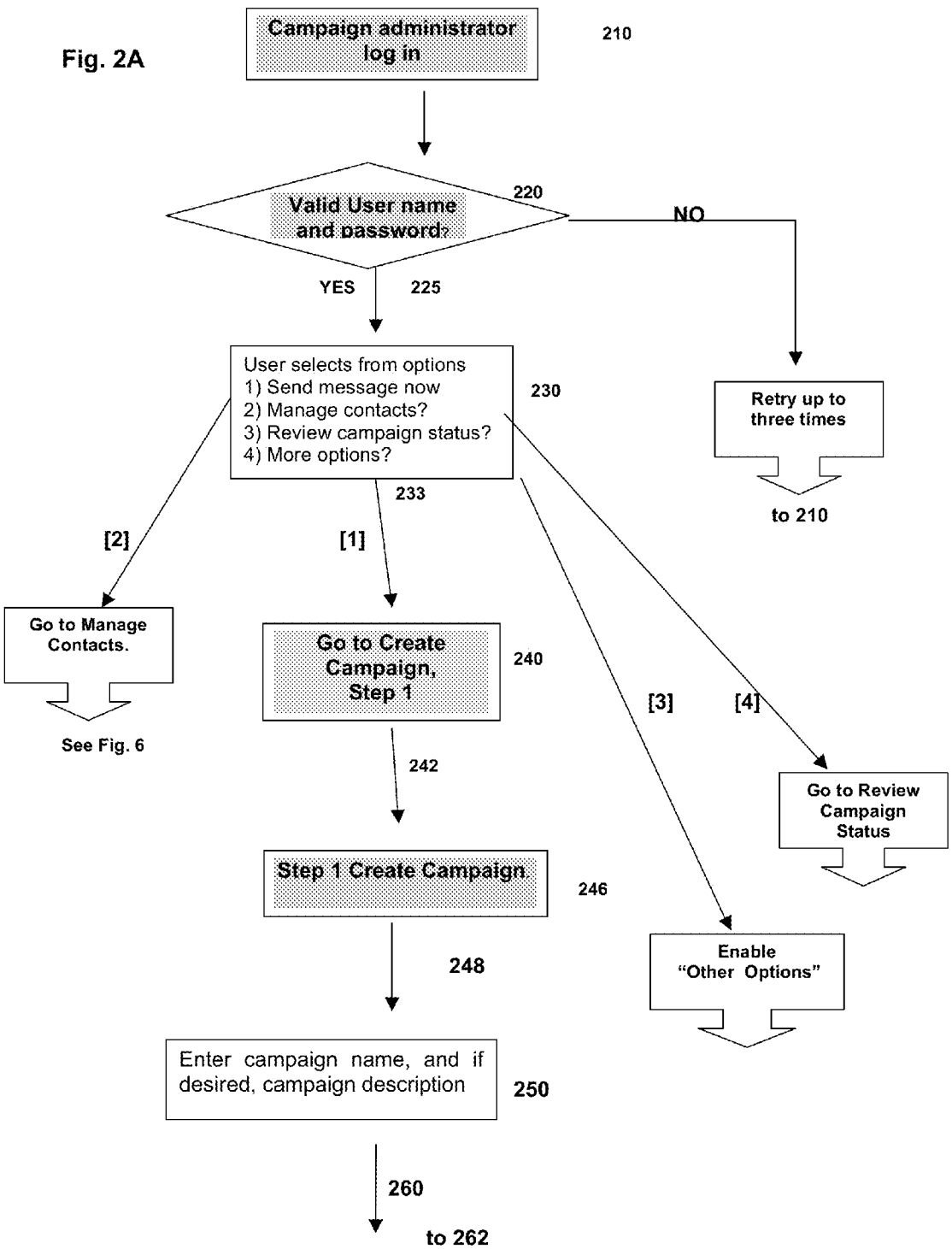
Figure 2D:
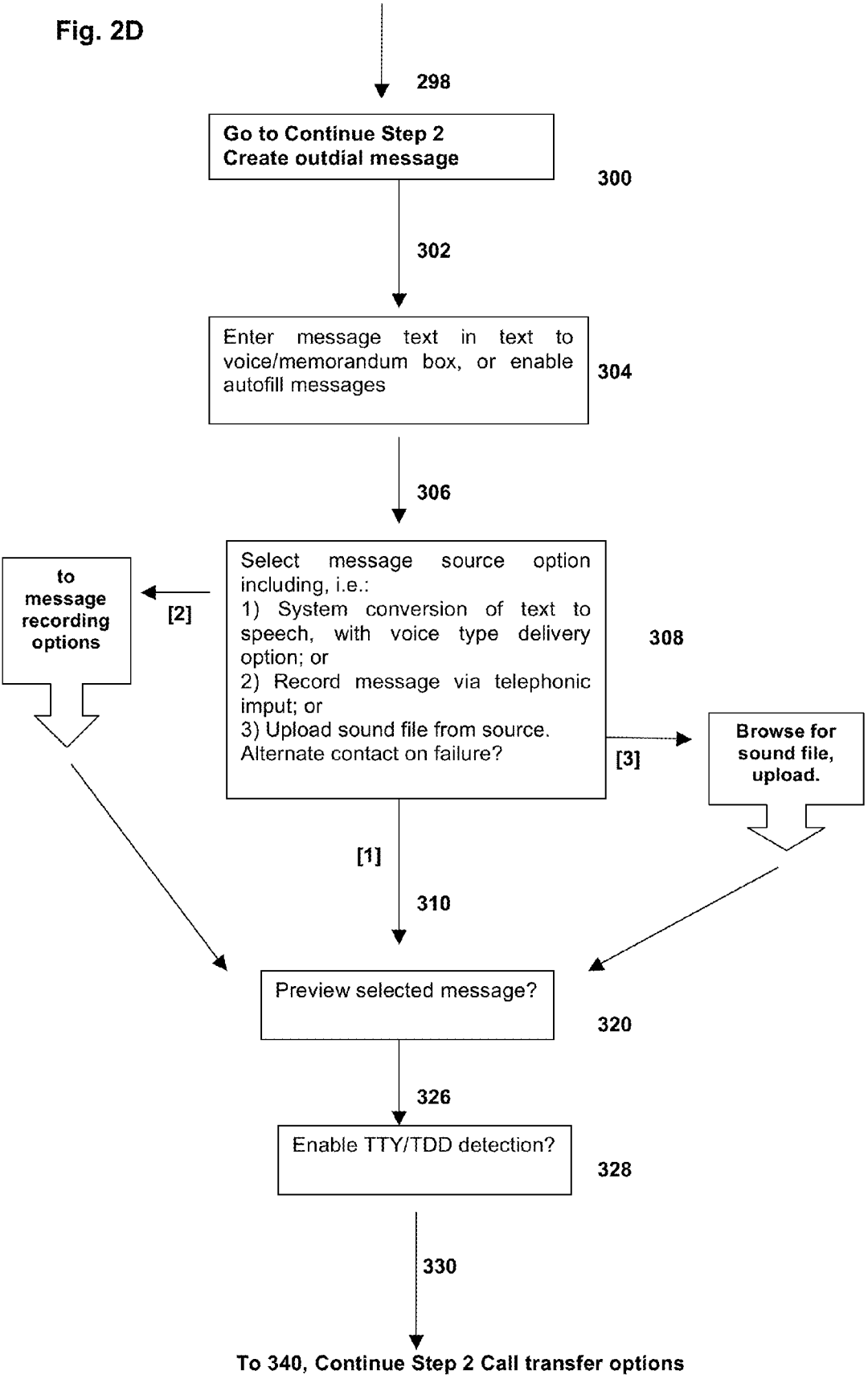

FIG. 2 shows a detailed flow chart of the process of creating a directed notification campaign. In a preferred embodiment, the campaign is an outgoing emergency notification campaign delivered over a diverse telecommunications network. FIGS. 2A-G demonstrates an essentially four step process that allows a campaign administrator to utilize the system with directed menus in order to rapidly and precisely target a campaign to those in need of notification. FIGS. 3A-F show samples of interface screens that can be utilized as the system interface for initiating a notification campaign. The system and method as disclosed in FIGS. 2 and 3 is designed to allow rapid and accurate initiation of a notification campaign. In essence the administrative system provides for the directed set-up of such a campaign, in four basic steps. The first step is naming of the campaign, selection of message delivery criteria, and selection of the target audience for message delivery. In FIG. 2A, following administrator log-on authentication, beginning at 240 the campaign administrator names the campaign or selects a previously saved campaign. At 266, the message delivery system is chosen, and at block 270, the contact audience is selected. Block 270 may direct the administrator to choose contacts from a geographic database, as described in connection with FIG. 4, from a database saved group, or manually from saved contact identifiers. In FIG. 2C, as shown at block 290, a number of different message options are available. Step 2 of the process is completed by creating a message, either by, for instance, reading from a script, uploading a prerecorded message or utilizing a text to voice conversion capability of the system. In addition the TTY detection module of the system can be enabled or disabled, as indicated at block 328. The initiation process continues, by providing the administrator a capability to schedule the initiation and termination of the campaign, as shown in relation to FIG. 2F, e.g., blocks 410-420, and FIG. 3E. Finally the prepared campaign may be activated in Step 4, as shown in FIG. 2G, and in the exemplary screen disclosed in FIG. 3F.

Figure 4A:
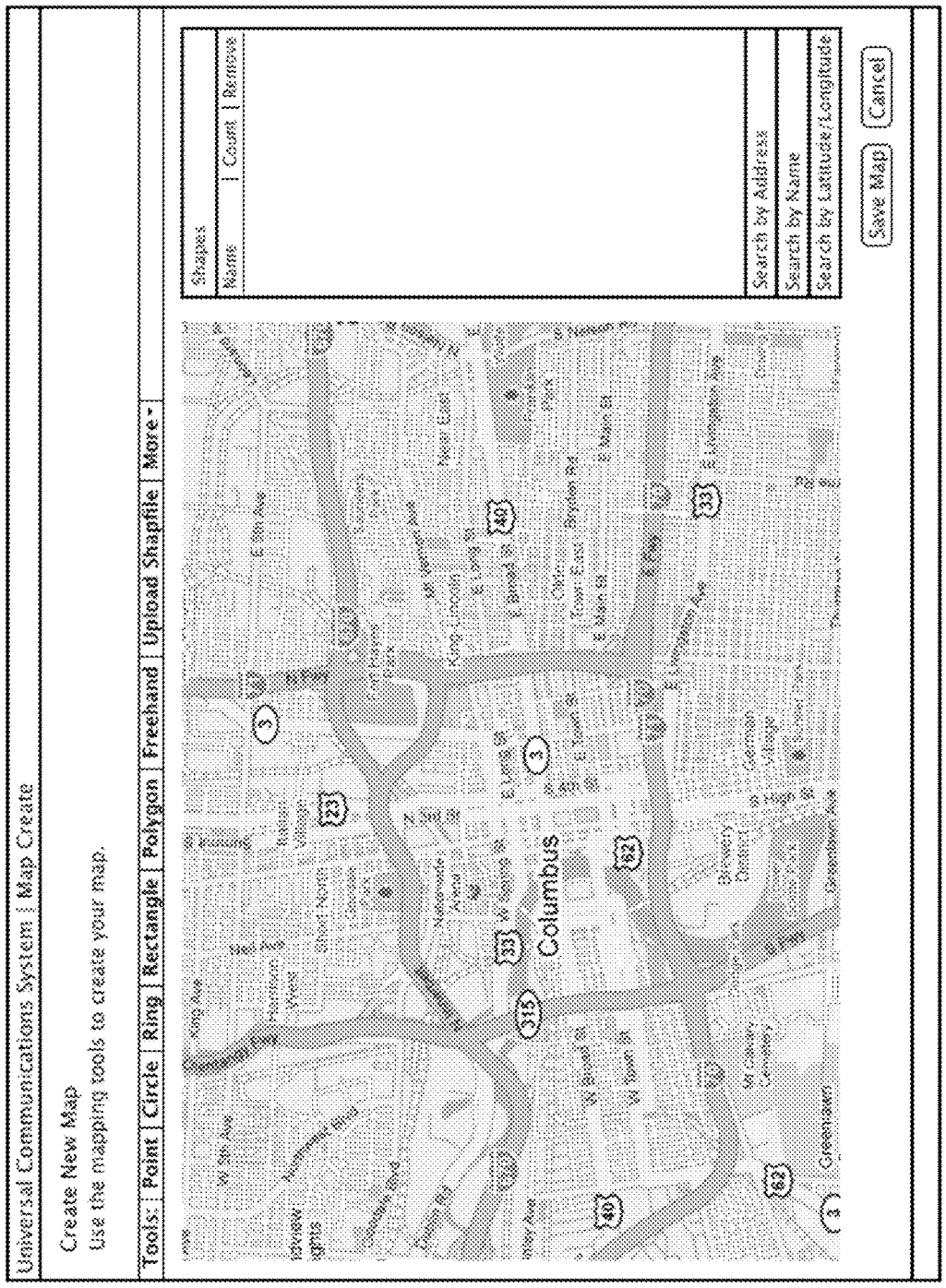
FIG. 4A-C shows sample geographic selection criteria for utilizing the geographic selection system for use with the system and method.
Figure 4B:
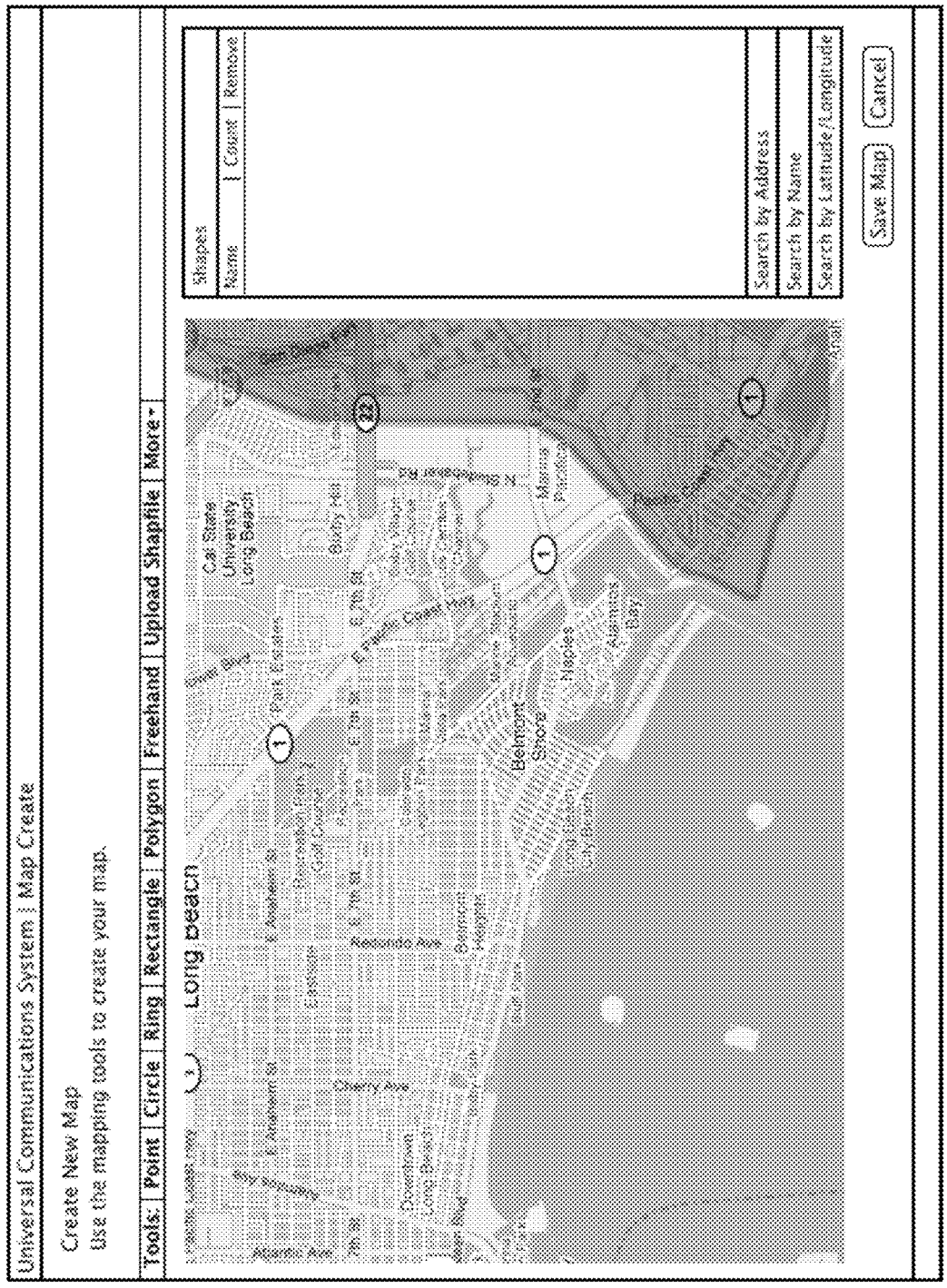

The discourse turns next to several examples of how the universal notification system is preferably implemented in practice. One prospective example exemplifies the speed and precision with which a system administrator—even one lacking experience with the system—is able to implement an effective campaign to warn individuals or populations of imminent danger. Consider, as an example, a hypothetical large metropolitan area located around a bay. As shown in FIG. 4B, the hypothetical geography of the area includes a shoreline running northwest to southeast and a river extending inland to the northeast. The city's densely populated downtown area lies on the northwest bank of the river and extends northward, progressing into increasingly less densely populated areas. Additionally, the area southeast of the river contains lighter density suburban neighborhoods.

A massive wildfire has been burning for some time in the rural areas well to the southeast of the city, with no previous indication that the wildfire would progress to the northwest and endanger the city. Suddenly, for instance, weather patterns change and the progression of the fire makes an unexpected change in direction, heading northwest along the coast toward the city. In order to protect the at-risk population, emergency responders are forced to attempt the evacuation of a large group of persons quickly, and initiate an evacuation campaign using the Universal Communications System (UCS) disclosed herein.

The UCS is able to carry out effective mass communication campaigns for use in such a time of need—when speed, efficiency and precision are vital to a successful outcome. A successful outcome is considered to be delivery of the emergency notification in a manner such that property damage and personal safety risk are minimized in light of the circumstances at hand. Efficiency may be particularly vital where the available emergency response administrator has not had reason to utilize the system in the past or does not perform regular training with respect to mass emergency notification campaigns. Under these circumstances, an inexperienced employee may be responsible for, and many lives may depend on, the successful implementation of an evacuation protocol.

Figure 3A:
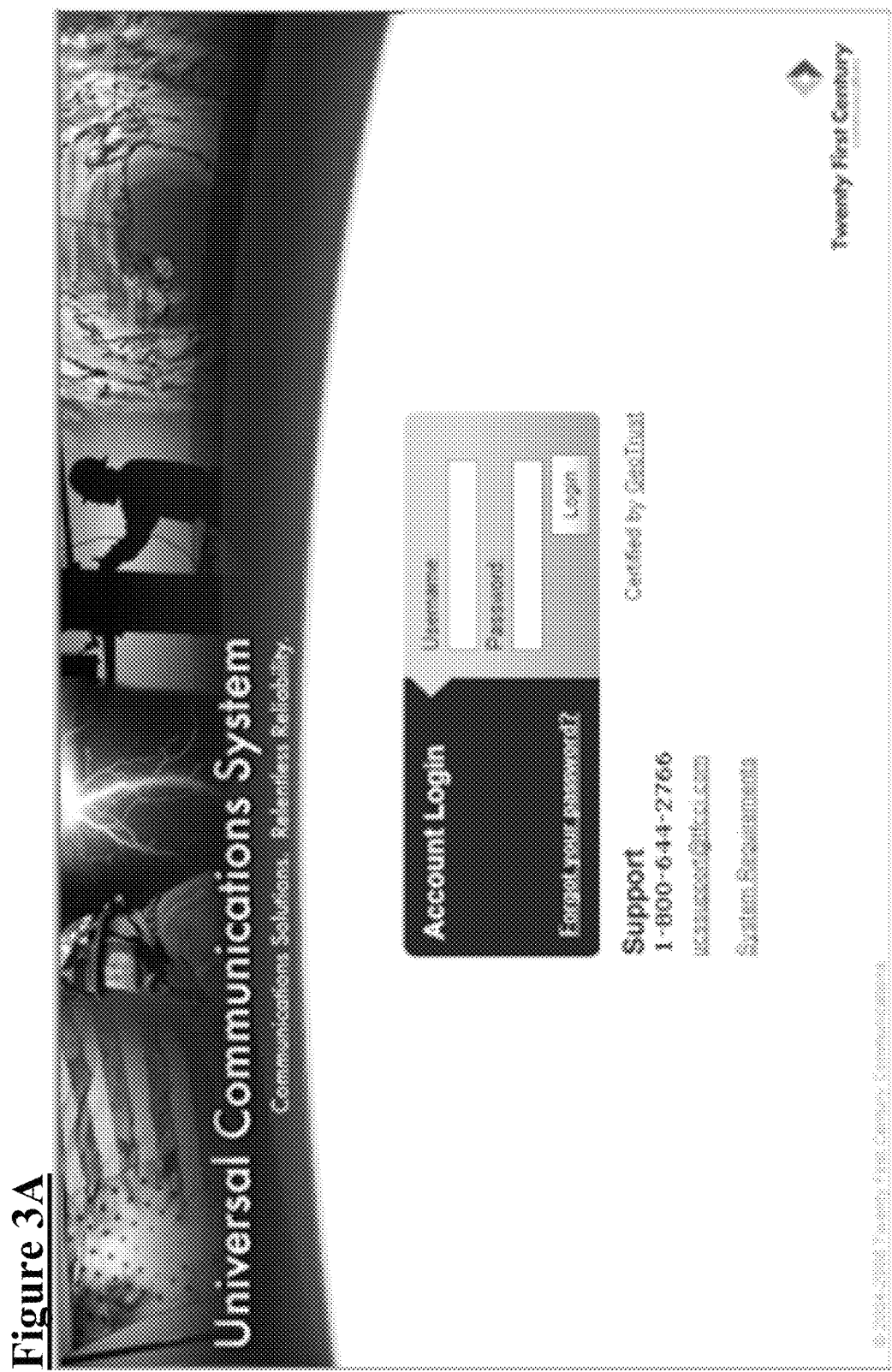
Figure 3B:
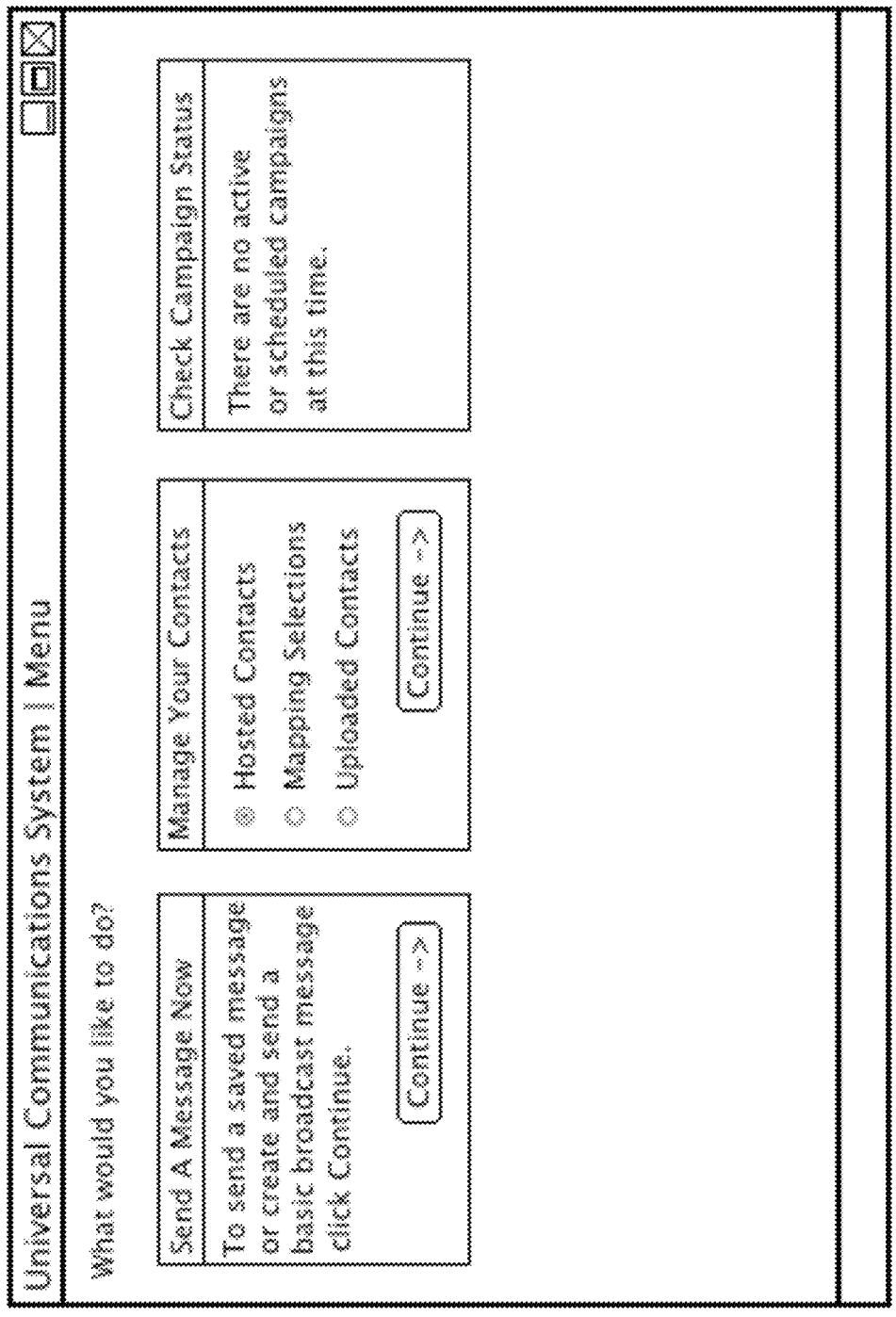

In a preferred embodiment, the system interface is provided via a remote terminal, over the telephone, or most preferably via a web interface available over the Internet. To utilize the web interface of the system, the administrator responsible for the evacuation campaign's implementation simply visits the Internet URL of the UCS web interface and, using a username and password, logs into the system, encountering the main menu. An example of the log-on screen is shown in FIG. 3A. One of the main options at the center of the screen reads "Send a Message Now" and prompts the user to proceed by clicking on a "Continue" in order to "send a saved message or to create and send a basic broadcast message" (a description of the action). An example of the UCS selection screen is shown in FIG. 3B. Thus is initiated Step 1 of four steps necessary to implement a campaign.

The administrator is then taken to the next interface, as shown in FIG. 3C, which contains the first step involved in the rapid and apparent process for implementation of a campaign. In the first step, a screen displays several headings and prompts to guide the user during the campaign's creation. The headings for step one include "Campaign Name," "Message Delivery," "Audience Type" and "New or Saved Message." The administrator for this new campaign names the campaign "Emergency Evacuation" and enters the description "emergency evacuation of persons to the southeast of the river due to wild fires." Next, the administrator checks "check boxes" delineating a list of message delivery methods. Message delivery methods pertinent to this example include outbound phone calls, text messages, and emails.

The next panel of the first interface screen's heading and brief description indicates that the user must choose an audience type. In the present example, because a mapping modality is desired, the administrator first selects the "Mapping" option, as the group of contacts most relevant to the evacuation campaign is most easily defined geographically. A new screen opens with a map of the city and surrounding area. The contact information of the targets of the evacuation campaign (the "contacts") is stored by the UCS and geocoded onto the map. (See FIG. 4A generally) Therefore, the user selects the desired contacts—using a freeform polygon tool—by drawing an area encompassing all available contacts to the southeast of the river and adding it as a contact group, as in FIG. 4B. The ability to map a group of contacts that was not predetermined contributes greatly to the efficiency of the UCS. It does so not only by drastically reducing the time to launch an effective campaign, but in this situation also avoids needless congestion on the evacuation routes and in the local telecommunications system in general.

As an addition to the system's ability to effectively communicate evacuation procedures to as many affected persons as possible, the user adds an additional group of contacts, either by choosing a pre-selected grouping or manually entering the contacts at the creation time of the campaign. This particular group of contacts contains email addresses for the local radio stations.

In the present example, unfortunately the emergency response system of the city was not prepared to cope with the unexpected sudden need for evacuation, and thus there were no prerecorded messages. Thus, the administrator chooses to create a new message at the last panel shown in FIG. 3C and clicks the "Next" button and proceeds to Step 2.

Figure 3D:
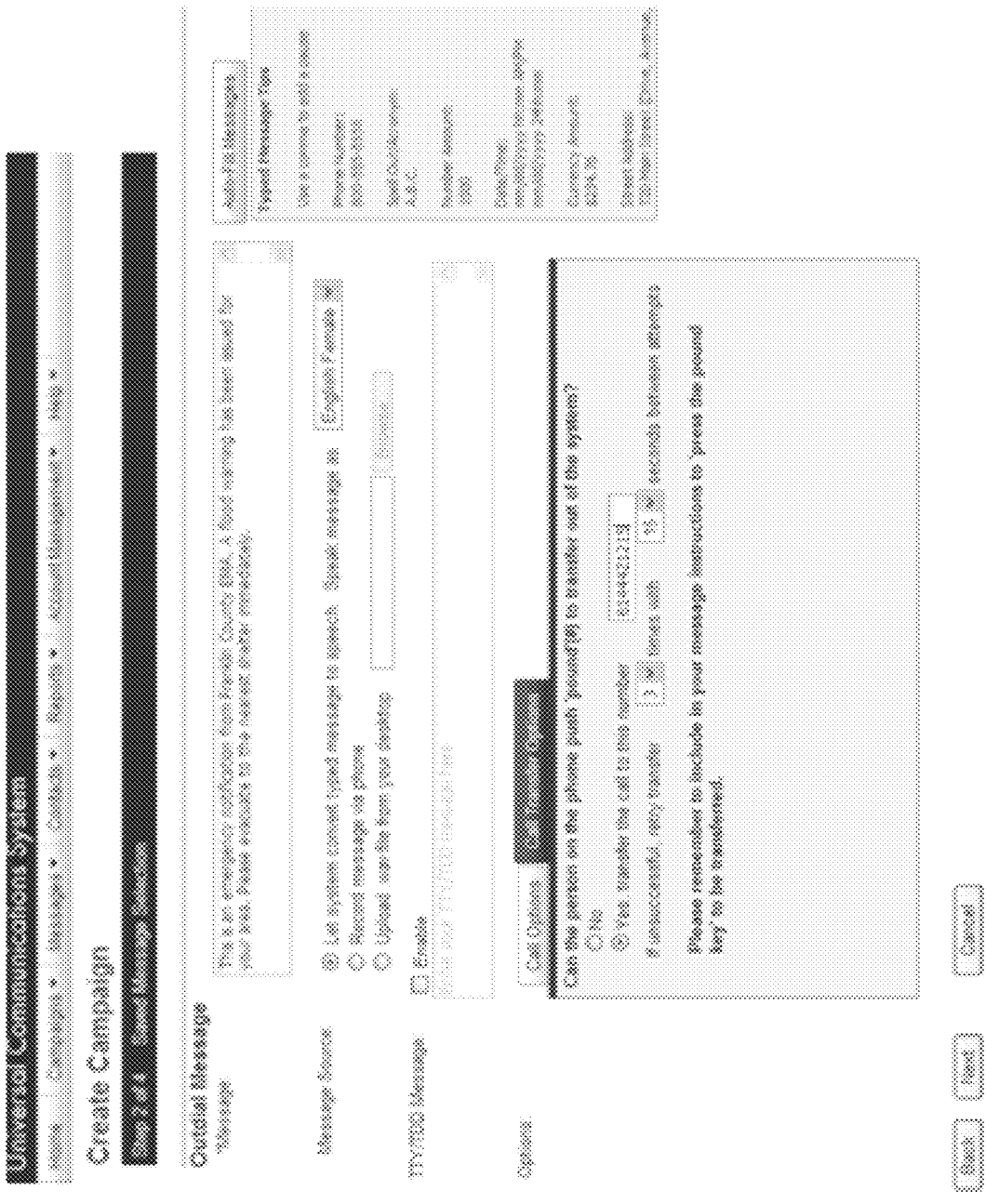
Figure 3E:
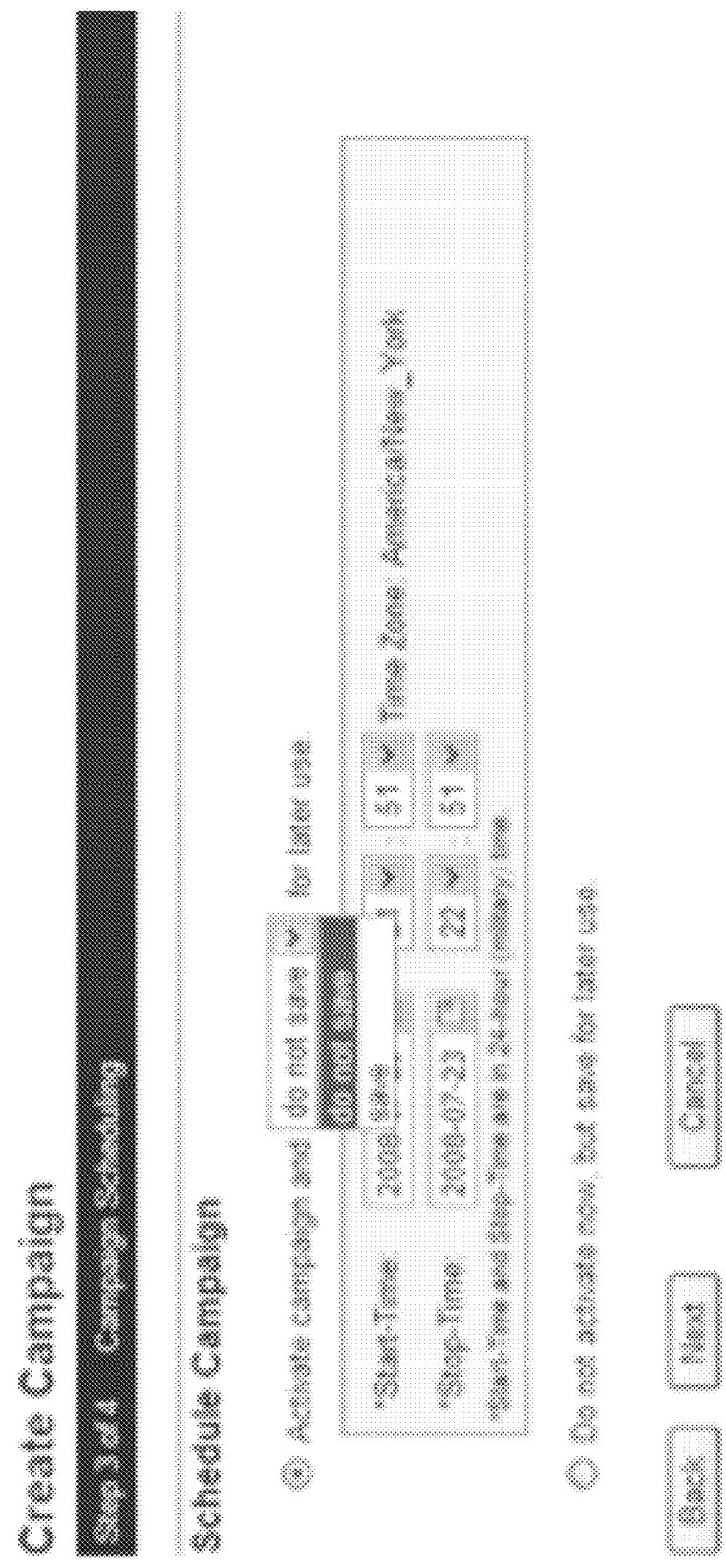

As shown in FIG. 3D, the administrator creates the outgoing evacuation message at Step two. Because the administrator chose to send text messages in step one, the user types the message into the "Message:" text box:

"This is an emergency alert. All persons south of the river are in danger due to wild fires and are advised to begin evacuation immediately."

The user then checks the "Record message via phone" radio button and reads the message into her phone, which is recorded by the UCS. In order to account for hearing impaired persons, the user also checks the check box to enable TTY support, and repeats the text message there.

The last task encountered by the administrator in Step 2 involves setting the call options. The administrator proceeds by first entering a "Caller ID" number—in this case the emergency number for the city or the number of an emergency response team equipped to handle incoming questions or calls. This action is followed by the administrator selecting options from each of the eight drop-down menus to set the parameters for the outgoing calls. To achieve a high success rate in persons contacted and informed of the evacuation, the administrator chooses to call each available telecommunications contact, to retry three times upon an unsuccessful attempt, to wait three minutes between attempts, no throttle scheme, enable TTY, and implement success criteria based upon an answered call or connection to a TTY device. As shown in FIG. 3D, the interface provides additional help options, along with other menu options. It is expected that the interface will provide the experience administrator with a variety of modalities if desired, while maintaining a generally Spartan and intuitive interface such that new users are cued to the important steps needed to implement a campaign.

Figure 3F:
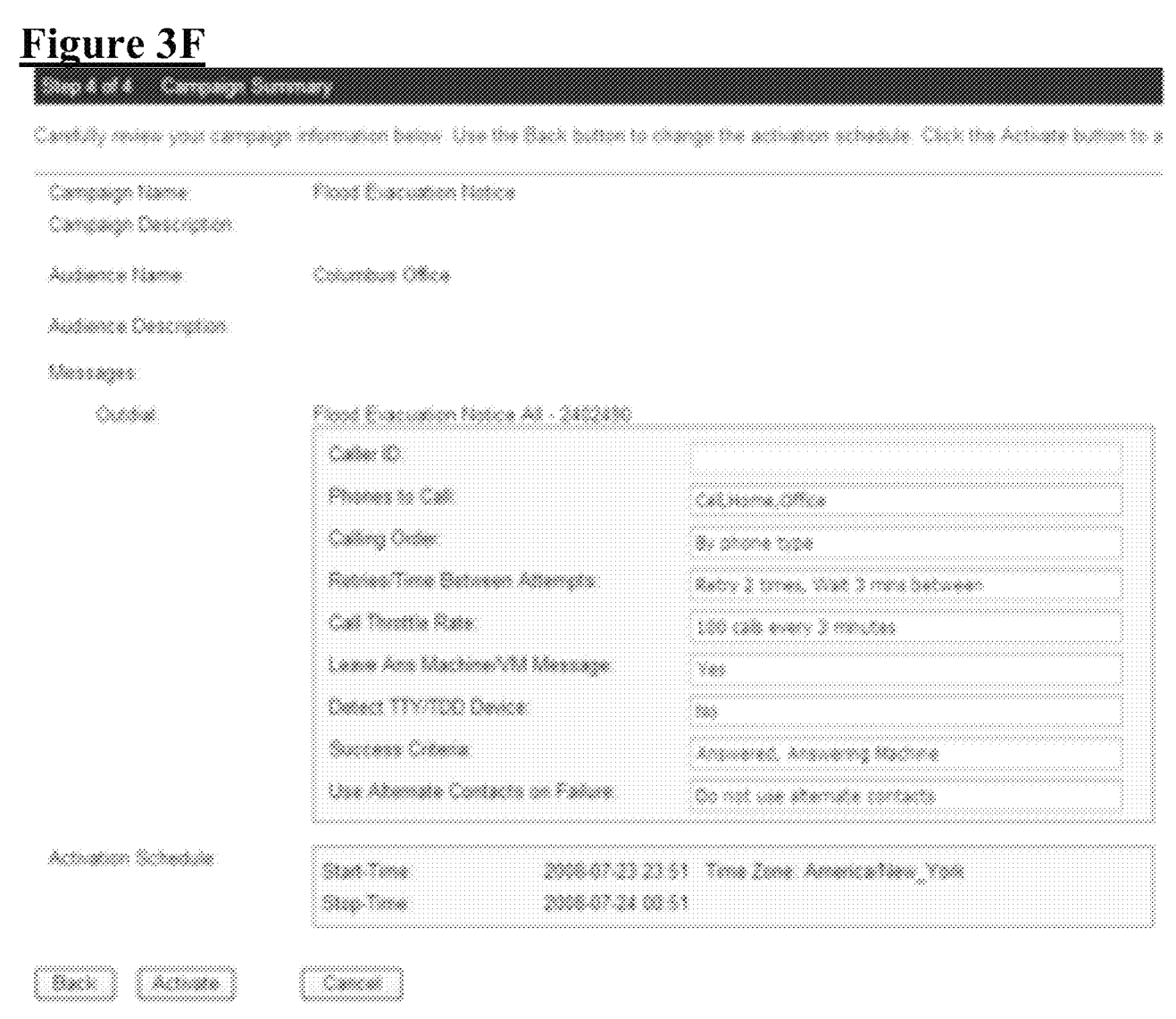

The administrator proceeds to Step 3 by choosing "Next" and is prompted to choose a start time and stop time for the campaign, and whether to save it. For example the administrator may choose to save the campaign, to start immediately, and an end time three hours into the future completes Step 3. The administrator would click the "Next" button and proceeds to Step 4. Step 4 acts as a confirmation step, allowing the administrator to confirm the set parameters before invoking the message delivery system. Step 4, as shown in FIG. 3F presents a confirmation screen that confirms the campaign settings. The campaign is initiated by the administrator clicking the "Activate" button.

Upon activation, text messages are sent to SMS-capable devices, detectable TTY devices, and email accounts, for example. The user's voice recording is sent through telephonic delivery, including by telephone calls. An email received by local broadcast stations, for instance, enables nearly instantaneous, efficient broadcast of the details of the emergency situation in conjunction with the individualized communications utilized by the UCS.

The efficiency of the UCS is further demonstrated considering the following variation on the above example: If the emergency responders for the city have been required to take similar actions in the past or have predetermined that an evacuation plan such as the plan mentioned above would likely be needed in the future, an entire campaign might be saved or prepared in advance. The saved campaign would include default evacuation messages, preloaded lists of contacts, and geographic groups selected for communication from those contacts.

Another prospective example of the implementation of the UCS capability is demonstrated by a hypothetical emergency involving a hypothetical chemical plant located in a rural community. Even though the area is lightly populated, the threat of an accident occurring at a plant still poses a serious danger to the community and creates a need for thoughtfully planned crisis control procedures. The scenario most likely to occur involves an implementation of the UCS by a local area emergency response unit (e.g., the county sheriffs office).

In this example an explosion at the chemical plant ruptures several large, pressurized tanks containing potent, highly toxic chemicals, which are released in gaseous form. The chemicals are lethal in their predicted concentration, and would be deadly to any person caught within the cloud in an increasingly wide area downwind of the accident site. The gas immediately begins to disperse into the surrounding area. The sheriff receives notification of the accident through monitoring equipment, direct contact from plant personnel, or direct contact from a witness. Importantly, the sheriffs office is in the best position to obtain and maintain records of contacts for the area. Access to government census data, county and state records, and other such potential sources of contact information enable the sheriff to maintain current and comprehensive records of potential contacts. Additionally, the sheriff runs a contact registry service which provides concerned citizens with methods for registering contacts with the sheriff for use in the case of an emergency, including an email address, web-based HTML form with the ability to post information into the sheriffs contact database, and a telephone number.

Therefore, after notification of the emergency, the sheriffs employee responsible for the implementation of the UCS saves all contact records as some variation of a comma delimited text file (e.g., .csv, or comma-separated values) and proceeds to the Internet URL of the UCS web interface to log into the system. The user is shown the main menu of the UCS, and chooses the radio button labeled "Uploaded Contacts" under the heading "Manage Your Contacts." The user then advances to the next screen and chooses the "Upload New Contacts" button and proceeds to upload the updated contact list, which is then automatically geocoded to the mapping function.

Figure 4C:
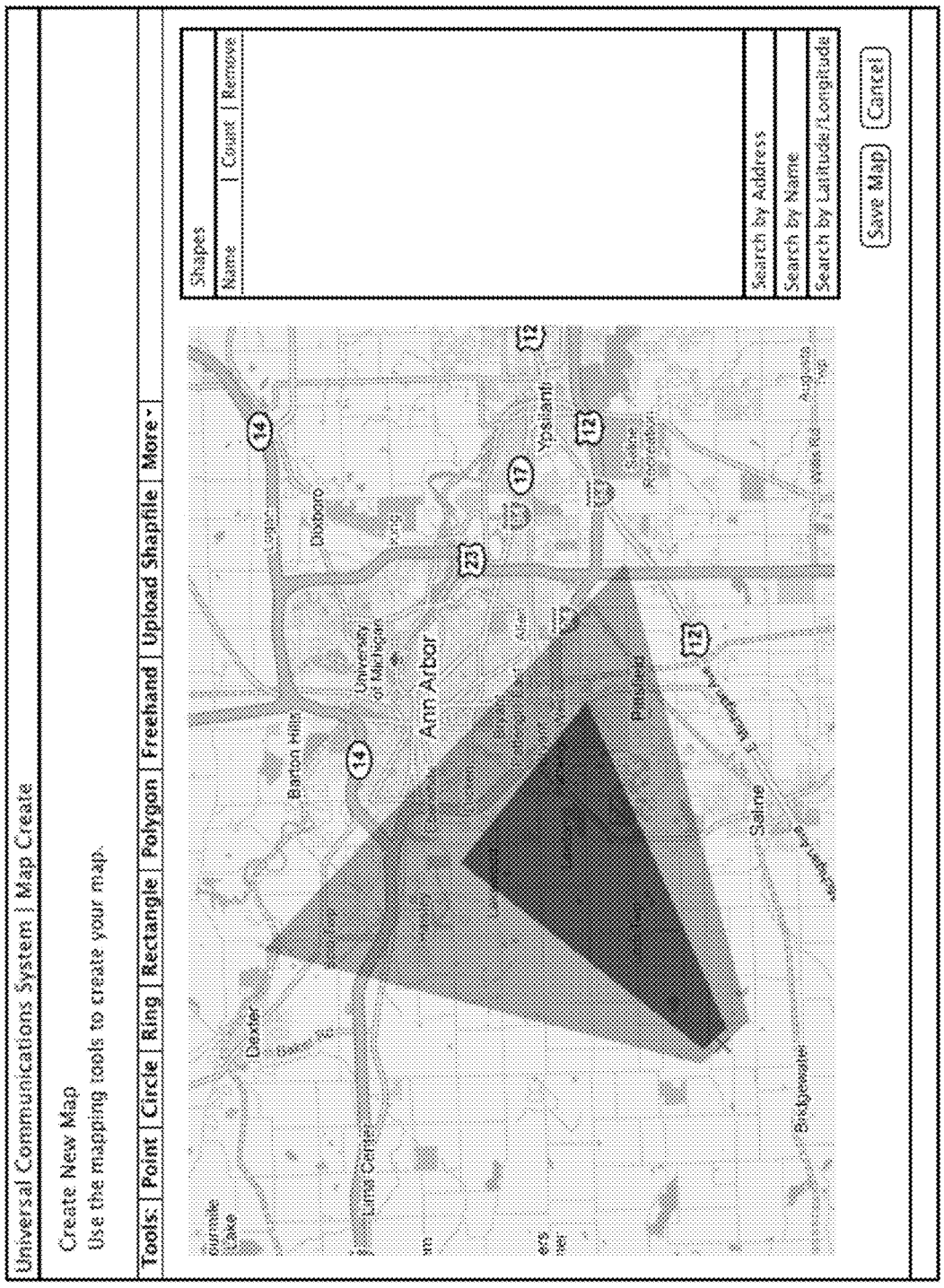

The sheriff's office, having planned for such a disaster in advance, has saved a campaign containing all of the call options and messages preset and prerecorded. All that is needed now is to alter the "Audience Type" of the saved campaign by creating one or more trapezoidal shapes centered at the location of the chemical plant and extending out to encompass the dispersal area, as shown in FIG. 4C. The user then begins the campaign and the UCS begins communication with the chosen contacts and informs them of the accident and emergency procedures.

As this is a rural area, the local telephone lines are much fewer in number than in a large metropolitan area. Therefore, if the UCS were to attempt to contact the entire list of chosen contacts at the start of the campaign, there would be a backlog of telephone calls. In a worst case scenario, overloading the system could cause a fault that disables the entire telecommunications system for a period of time. For this reason, the sheriffs office could choose to implement the call throttling procedure to limit the number of calls attempted at any given time, increasing the chances that any given contact attempt will result in a success, thereby creating a more efficient campaign.

As a variation of this example, the administration of the UCS might be within the responsibility of the entity managing the chemical plant. The responsible administrator may be well trained and responsible for a multitude of similar processing plants, and has undertaken to manage the risk presented to neighboring communities by utilizing the UCS capability in-house. The first-hand knowledge held by the employees of the company make their administration of the UCS more efficiently implemented, as the trained administrator is able to better understand the risks and reactions that must be taken toward the most efficient response to such an accident.

The hypothetical chemical company's engineers, familiar with the chemicals involved at any particular plant site, are able to come up with fallout projections for certain types of accidents. They are able to use atmospheric and weather conditions, along with chemical properties such as operating temperature and molecular weight, to create shapes for the mapping function of the UCS ahead of time. These shapes are good estimates of the areas most drastically affected by a certain accident.

To populate the company's UCS system with current contacts and subsequently geocode them to maps of the potentially affected area, the company has several options. It can offer a registration service for persons living in the area near the plant in the same manner as described above. It might also work in conjunction with local emergency responders to receive from them an updated database, either electronically or as a comma delimited file. Both methods used concurrently ensures that the maximum number of people will be reached.

At the time of the accident, an agent at the entity's administrative headquarters who is in charge of administering the UCS system is notified of the incident. Using data reported from the accident site and weather data, the administrator chooses the most appropriate shape to use in the mapping function when choosing the audience type.

Similar to the sheriffs implementation of the UCS system, the entity's administrator proceeds to the Internet URL of the UCS web interface and logs into the system. After loading a saved campaign, the user proceeds to alter the "Audience Type" by choosing the predetermined shape and placing it in the correct position on the map of the chemical plant and surrounding area, as shown in FIG. 4C. The campaign is promptly initiated, warning persons in the affected area of the danger.

In the a preferred embodiment, is an option to exclude a certain subset of contacts from the data set that is to be contacted. In essence the system allows the administrator of a campaign to call all contacts except for one or more specifically identified contacts, e.g., a telephone number, thereby providing the ability to not call indentified numbers within a geographic notification area. Exclusion campaigns can either be utilized in conjunction with the mapping modality described above, or as a separate adjunct to the system.

For example, during a public safety emergency, such as a hostage situation at a specific address, it is desirable to notify all those in the area that may be in danger to be notified of the emergency. This notification would desirably be to the exclusion of contacts located at the specific address or locality of the hostage situation, or other location where knowledge of intervention by public safety officials would be strategically ill advised. Thus, either by manually entering contacts which are to be excluded from a notification campaign, or by utilizing a narrow geographic selection for exclusion, the present system can be implemented to apprise all contacts present in an area of danger of the situation, and the response they should take to the event, while at the same time, avoid interfering with law enforcement action. In addition, the contacts database can be searched for potential contacts to exclude, i.e., based on address, name, or known association with particular individuals. The exclusion feature of the campaign system provides a mechanism for broader utilization of the notification features of the system by public safety officials, wherein in the past, law enforcement has been forced to go door-to-door to make localized specific warnings, or has avoided distributing a notification campaign because they wished to avoid interfering with an active intervention.

In essence the campaign exclusion feature allows selection of a contacts list, but implements an algorithm that distributes the message campaign to all the selected contacts, "but not" for contacts with particularized identifying features, i.e. present at, or registered to an excluded address.

Another example of a public safety emergency that may desirably utilize the exclusion feature is during a law enforcement sweep or multiple location drug bust. When law enforcement action is active throughout a neighborhood or area of a city, law enforcement may wish to warn citizens that are not involved to avoid potentially dangerous situations. The mapping module of the system, in conjunction with searches of the contacts database for contacts related to a particular address, can be configured to distribute a campaign to all contacts in an area except for those present at the identified addresses, or those of known associates with said addresses. In addition, the notification campaign can be configured to distribute a warning message of one type to the primary contact selection, and a message of a related type to those contacts excluded from the primary campaign. As an example, all telephones (or television cable control boxes) in an apartment complex could be distributed a warning campaign informing residents that "law enforcement is entering the complex to arrest a wanted felon." The contacts excluded from the campaign could be distributed a different message, such as "there is an emergency situation that requires you to turn off your TV and sit quietly on your chair." Thus all residents of an apartment complex would hear their telephones ring at the same time (or hear an emergency broadcast signal, for instance), but those "wanted felons" would not be alerted and incited to flee, or otherwise interfere with law enforcement.

A preferred embodiment of the system for emergency notification call delivery comprises an administrative system allowing a campaign manager to calculate the number of telecommunications contacts a selected campaign will generate. A database is available providing data that allows for calculating the maximum number of telecommunications contacts that the target telecommunication system for the selected campaign can efficiently transmit without disrupting the normal operation of the telecommunication system. Such information can be provided on a near real-time basis by testing the responsiveness of the target system, on a historic basis, utilizing knowledge of the system, or other means of estimating the capacity of a system known to those skilled in the art. The system provides for a call throttling module that provides for the selection of one of a plurality of maximum rate of delivery of telecommunications contacts during a message delivery phase of the selected campaign. The available throttling rates can be responsive to information obtained from the telecommunications capacity database, or set based on known parameters. An administrative input system is provided that allows the campaign manager to set the maximum rate of delivery of telecommunications contacts during the message delivery phase of the selected campaign. Finally, a rate of delivery component of the call throttling module then regulates the rate of delivery of telecommunications contacts delivered by the UCS modality. Upon activation of an emergency notification campaign, telecommunications contacts generated by the emergency notification campaign are delivered at a rate that maximizes the rate of emergency notification contact delivery without disrupting the normal operation of the telecommunication system targeted for the campaign.

Figure 5:
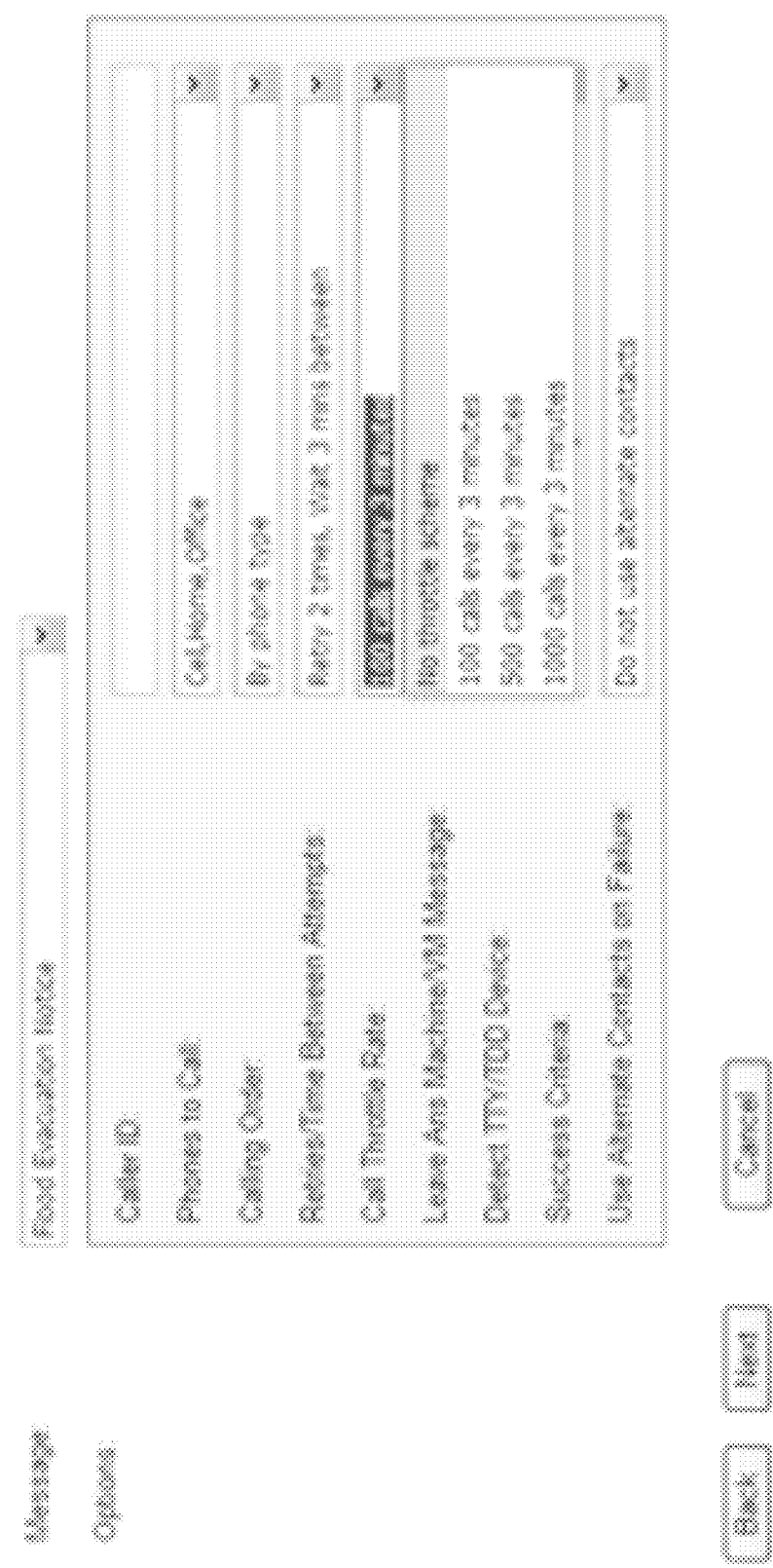
FIG. 5 shows a sample administrative interface for initiating a call throttling system for use with the method of emergency notification.

In preferred embodiments, the system delivers telecommunications contacts generated by the emergency notification campaign at a rate of one or more of about 25 contacts per 3 minute period, 50 contacts per 3 minute period, 100 contacts per 3 minute period, and 1000 contacts per 3 minute period. Similarly the system can be readily configured to deliver the telecommunications contacts generated by the emergency notification campaign at a maximum rate or within a user configurable rate range. FIG. 5 demonstrates the administrative interface of one embodiment of the call throttling administration.

It is a common problem when implementing notification campaigns, especially campaigns which are providing notification of an emergency, that the campaign is preferably delivered as rapidly as possible. In many situations, however, the telecommunications equipment handling the incoming communications messages cannot accept a high volume of notification messages. This is particularly true in congested areas, areas with substantial mobile telephone utilization, and limited wireless telecommunications capacity, and in rural areas, which may have a relatively low quantity of telecommunications interfaces, due to low overall population. In those situations of limited capacity, delivery of a large number of messages at the same time can lead to overwhelming the system, leading to total shutdown. To prevent shutdowns, many systems can recognize when a particular exchange is delivering an abnormal number of incoming calls, and block access to that exchange. The disclosed system utilizes a feedback loop to detect the numbers of call which cannot be delivered due to network congestions, i.e. "network intercepts." When the number network intercepts reaches an unacceptable number, for instance 0.5%, 1% or 10% of placed calls, the system can throttle back the call delivery rate to avoid blocking or shutdown, or to leave some capacity un-utilized.

When the throttling system is used in conjunction with the advanced mapping feature disclosed herein, the urgency of a particular campaign can be carefully tuned by the administrator to deliver a maximum rate of call delivery, to the most urgent message recipients.

In order to most efficiently deliver telecommunications notifications, it is advantageous to control the rate at which outbound messages are delivered to telecommunications portals, such as local publicly switched telecommunications networks (PTSN). A PTSN serving a defined local area is almost always limited in the number of circuits available through which to deliver messages. For purposes of this application, telecommunications circuits include, for example, wired land lines, cellular telephone connections, wireless connections, or other data delivery connections including fiber optic cable, Bluetooth and the like.

On those occasions when automated message delivery is demanded, it is advantageous for the throttling system to utilize feed back parameters. In previous systems, where call delivery throttling was utilized, the occurrences of network intercepts is manually monitored, wherein if significant network intercepts or busy signals are detected, then the call delivery throttle can be utilized to manually reduce the call transmission rate.

The new system utilizes various parameters to trigger an algorithm that automatically reduces the call transmission rate. For instance, in one embodiment of the system, if the rate of network intercepts is greater than about 10%, the system reduces the call delivery rate by about 25%. When the reset call delivery rate then is reanalyzed to determine the new successful call delivery rate.

One algorithm that describes an embodiment of the automated throttling system is as follows:

CDRi—initial call delivery rate
CDRa—adjusted call delivery rate
NIR—network intercept rate
TC—total calls delivered to network
OR—target NIR (optimal rate)
Where OR 0.1=NIR/TC
If NIR/TC is >0.30, then CDRa=0.5(CDRi);
If NIR/TC is <0.30>0.1, then CDRa=0.25(CDRi);
If NIR/TC is <0.1, then CDRa=1.25(CDRi)

Figure 6A:
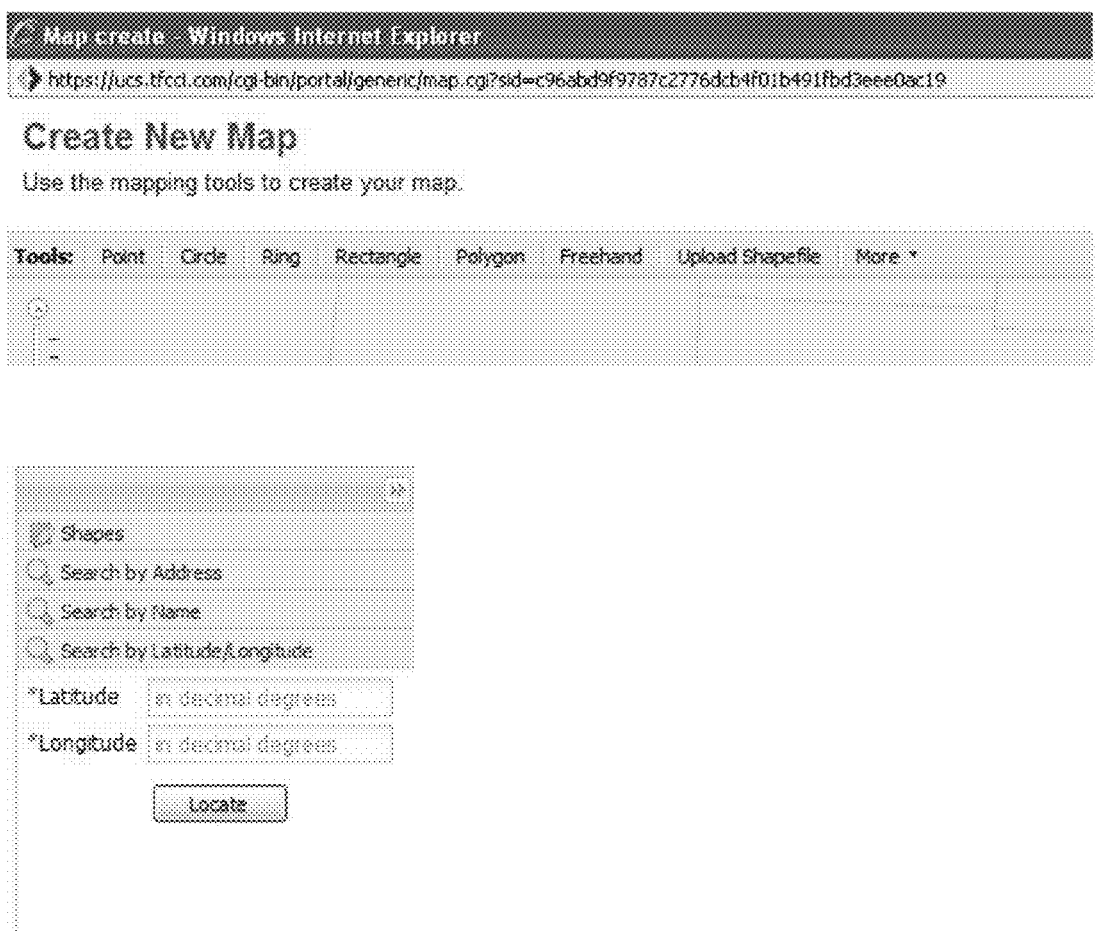
FIG. 6 A-I shows the administrative interface for the mapping module of the system.
Figure 6B:
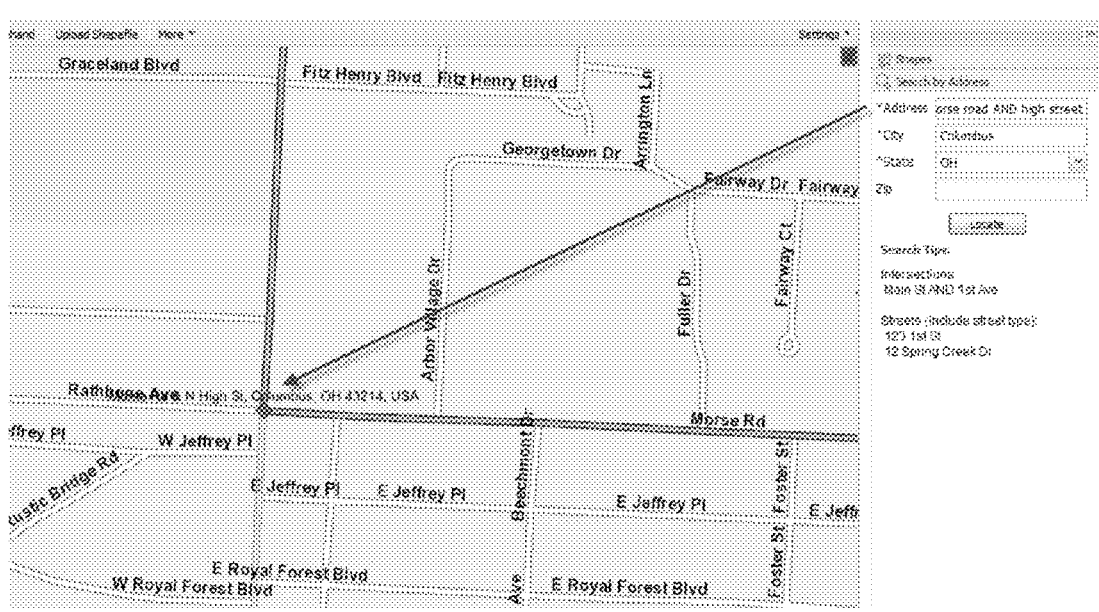
Figure 6D:
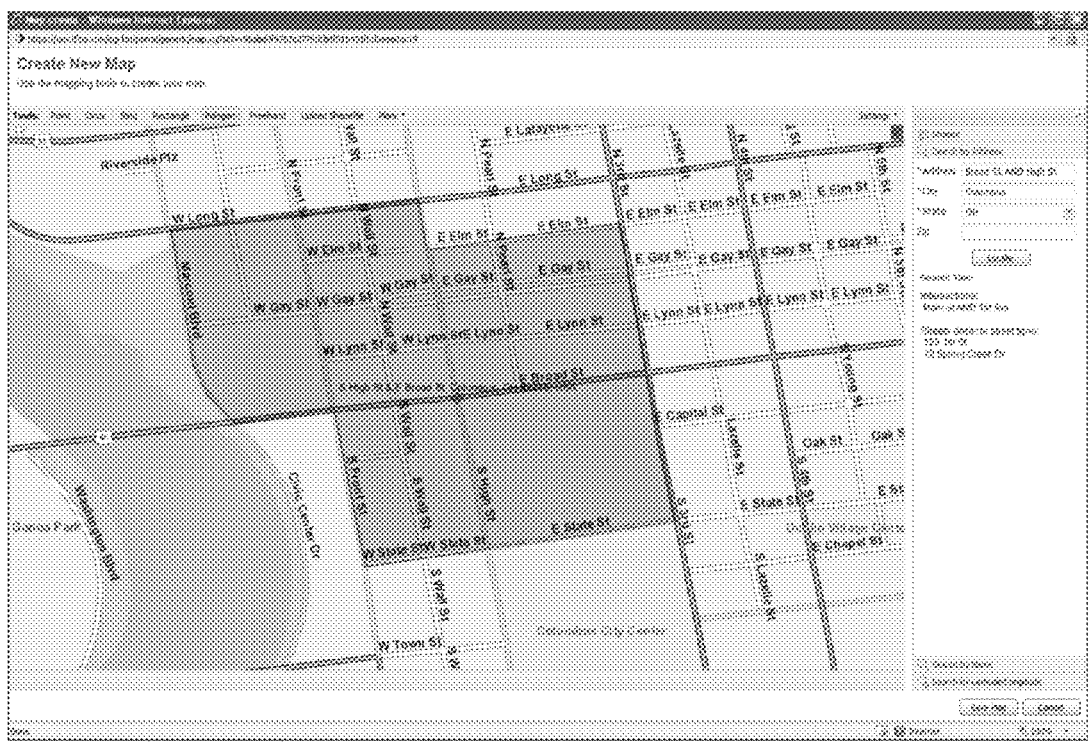
Figure 6C:
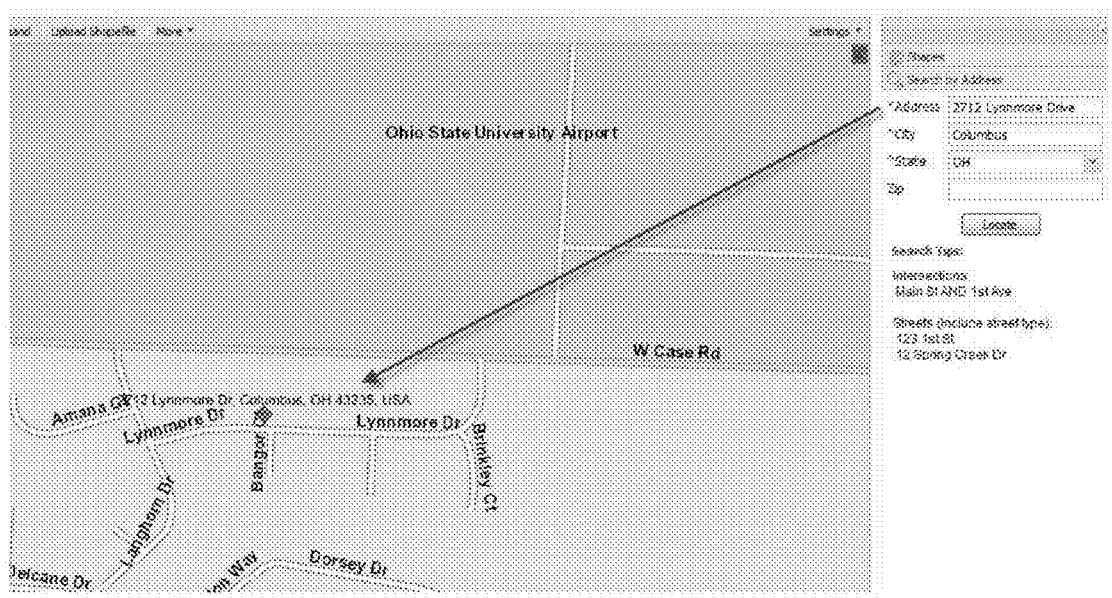
Figure 6E:
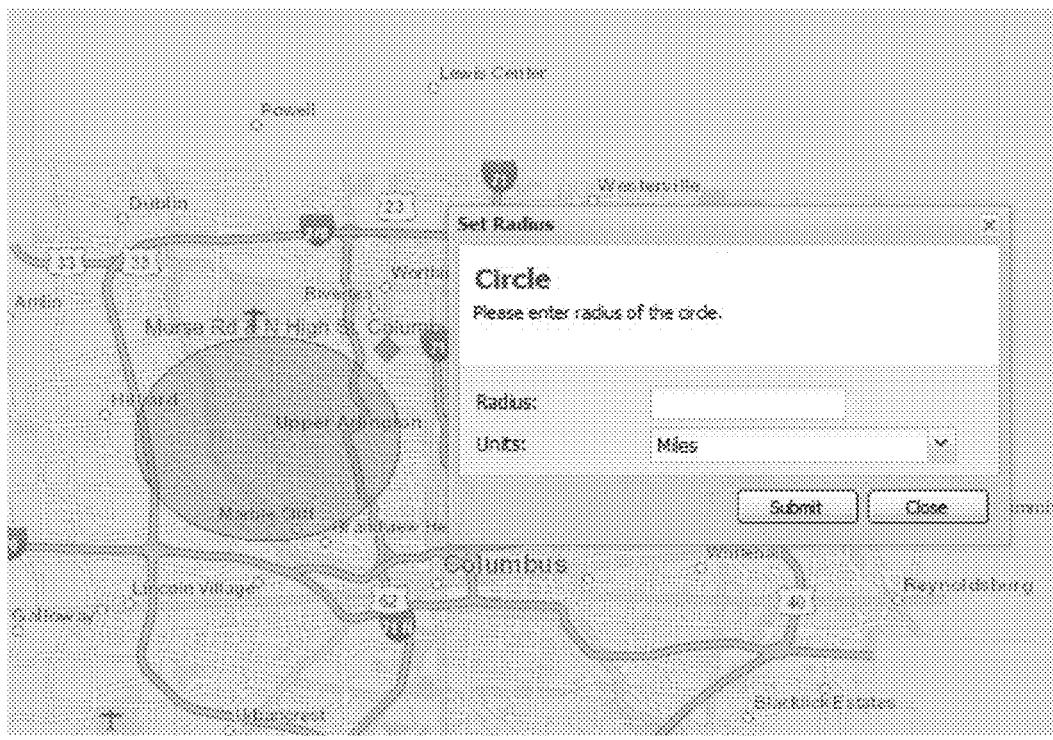
Figure 6F:
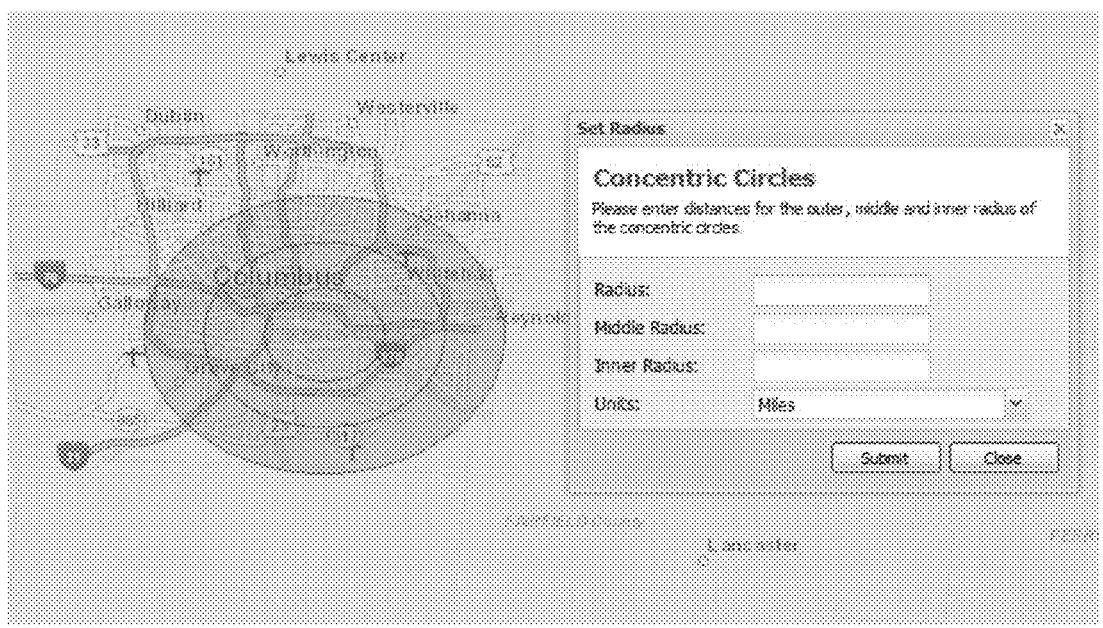
Figure 6G:
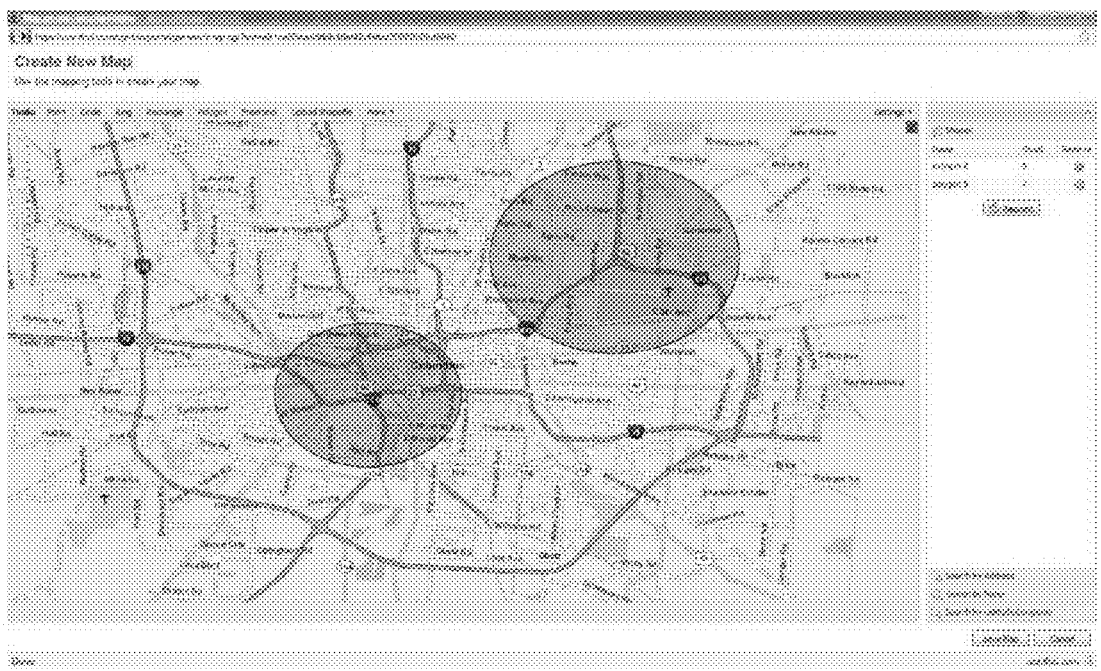
Figure 6H:
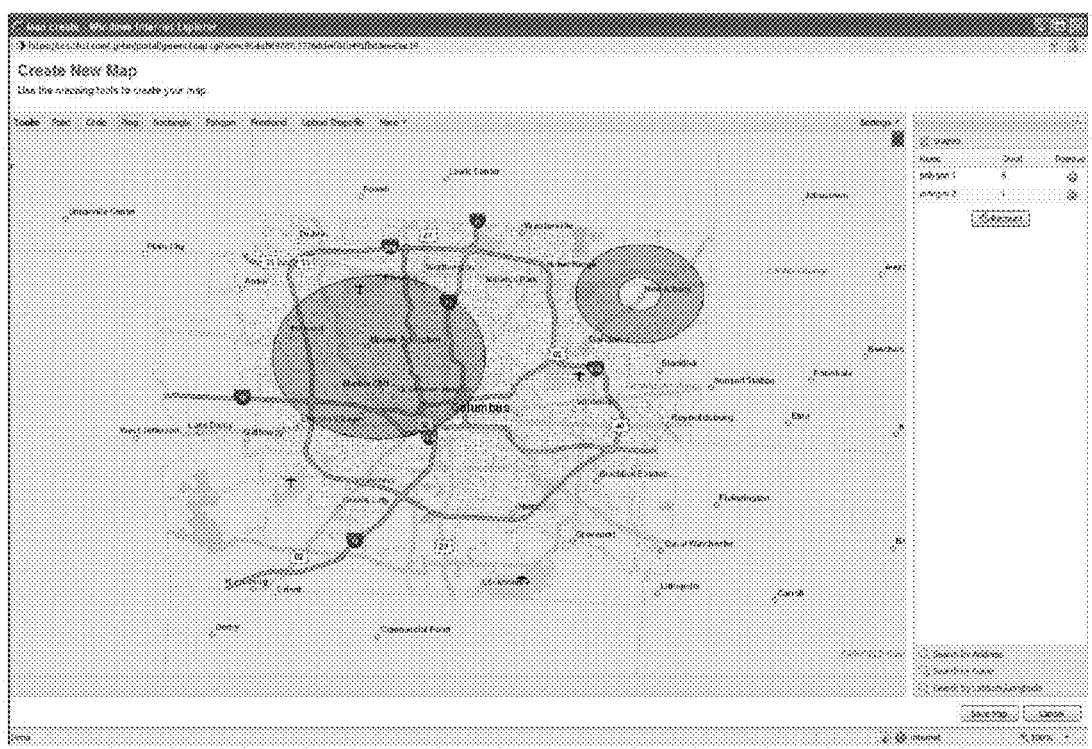
Figure 6I:
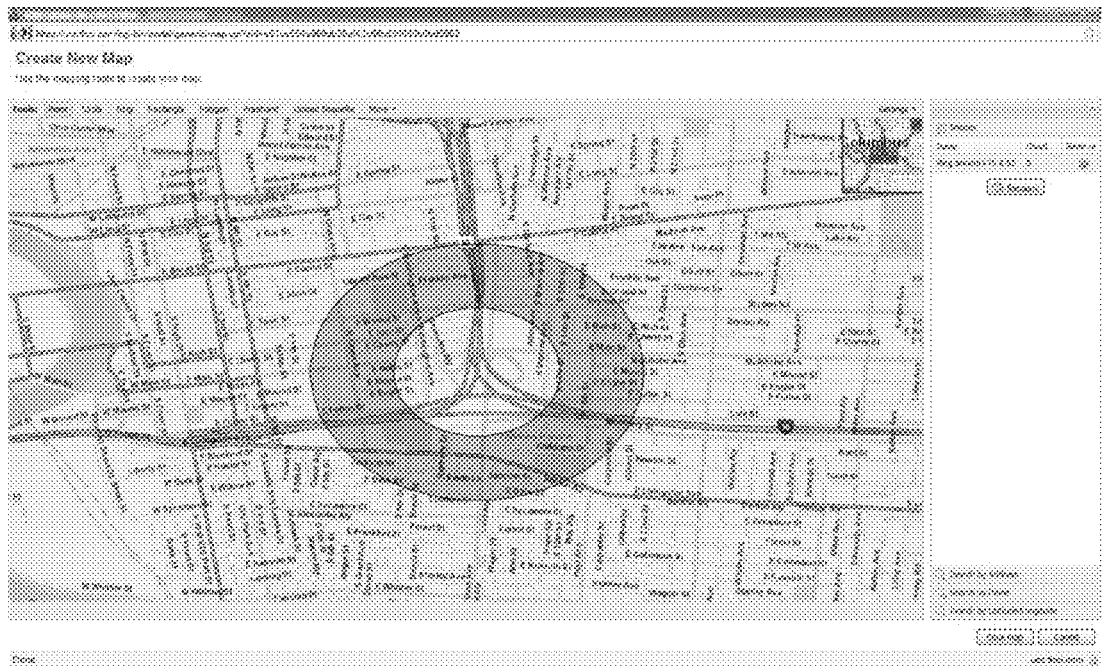

As shown in FIG. 6A-I, the mapping module allows for a robust selection of a campaign area, in order to provide a precise message targeting system. FIG. 6A shows the system interface of the mapping module, providing a number of tools for choosing a desired area. The mapping system allows for selection of an area by address, name, intersection or latitude and longitude. As shown in FIG. 6B and FIG. 6C, selection of a geographic point, such as an intersection, or a given address, respectively, allows the mapping system to home in quickly on the desired location (for instance to notify of the hostage situation described above). As shown in FIG. 6D, once a central location is identified, the drawing tools can be utilized to identify the campaign area. The Mapping Toolbar provides a number of selection features, such as point, circle, ring, multiple circles, and shape selections such as freehand, polygon, freehand and uploaded shape files. As shown in FIG. 5. a preferred embodiment of the system allows for utilizing vectors and rates to encompass plumes, such as for a chemical release hazard, wind direction, for fire hazard, or elevation, for flood plain hazards. Thus, those citizens at heightened risk of a public safety hazard can be selected and notified first. In FIG. 6D, the polygon tool is used to select an area based on a street grid, with the centrally located "Broad and High" center point. As shown in FIG. 6E, a circle or ellipse is formed of a selectable radius, to alert, for instance all contacts present within a 5 mile radius of an event. The mapping module allows for selection of multiple shapes in a single campaign, or for successive campaigns. As shown in FIG. 6F, a series of concentric rings can be selected, with the campaign being directed to for instance start with the inner ring, and move away from (or towards) a center point in delivering the notification message. As shown in FIGS. 6G-6I, other multiple polygonal shapes can be selected in a single campaign, or multiple polygons can be selected and be targeted with an appropriately phrased message for the selected area. In certain situations, a ring shape such as shown in FIG. 6I is desirable, with those contacts in the central (unselected) area being excluded from the notification, for instance in the unfortunate situation wherein those un-notified contacts are being directed to "evacuate in place."

The mapping module allows selection of multiple polygons, or other regions in a single campaign initiation session. During the selection of a geographic area for campaign initiation, the administrative interface can be configured to provide feedback to the administrator regarding the number of contacts that are being selected during the area selection process, and an estimate of the rate at which messages can be delivered to said contacts. The message throttling interface can be configured to calculate in a near real-time manner the availability of service ports, and the rate at which those ports can accept incoming communications. Thus, the administrator can be provided with an estimate of the length of time it would take to complete the campaign, and immediately recognize the need to resize the geographic selection, based on the requirements of a particular public safety incident. Since the mapping module allows for selection of concentric or overlapping polygons, and each of the overlapping polygons can have a slightly different notification campaign delivered to it.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above systems and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

What is claimed is:

1. A system for delivering campaign messages over a telecommunications system, comprising:
   a campaign administrative interface comprising a contacts selection module, a contacts database, and a message delivery criteria system, the campaign administrative interface configured to allow an administrator to select contacts from the contacts database and distribute a campaign message based on criteria the administrator selects from the message delivery criteria system;
   a message delivery dependent system configured to allow selection based upon a destination geographic location;
   a telecommunications interface system configured to allow for delivery of messages to a variety of telecommunications systems;
   a mapping module configured to select a geographic area; and
   a message delivery throttling system configured to regulate a rate at which emergency notifications are delivered to a connected telecommunications system when a number of network intercepts reaches an unacceptable number, wherein
   the campaign message is configured to be delivered over the connected telecommunications system to a group of message recipients selected from the contacts database according to selected criteria in a geographic progression using a maximum message delivery rate that maintains a selected allowable frequency of incomplete message deliveries due to network intercepts.

2. The system of claim 1, wherein incoming customer contacts are by at least one telephone, land-line telephone, cellular telephone, instant message, email, voice over Internet Protocol (VOIP), internet enabled voice or text chatting, text to voice connections utility toll free telephone, local telephone, long distance telephone, and VOIP, SMS text messages, facsimile transmission, video link, cable television, digital television, wireless internet, satellite telephone and radio telephone communications.

3. The system of claim 2, wherein the incoming customer contacts are by telephone.

4. The system of claim 1, wherein the mapping module is configured to select a geographic area based on a public safety event progression.

5. The system claim 1, wherein the mapping module is configured to select a geographic area are based on at least one of a vector based rate, elevation, or area egress rates.

6. The system of claim 1, wherein an alternative emergency notification message is configured to be delivered to the identifiable group of contacts excluded from the emergency notification campaign.

7. The system of claim 6, wherein the alternative emergency notification message is configured to direct the identifiable group of contacts excluded from the emergency notification campaign to remain in place rather than to evacuate.

8. A system for emergency notification call delivery, comprising:
   an administrative system configured to allow a campaign manager to calculate the number of telecommunications contacts a selected campaign will generate;
   a database configured to provide data to calculate the maximum number of telecommunications contacts that a telecommunication system targeted for the campaign without disrupting the normal operation of the telecommunication system;

a call throttling module configured to provide the selection of one of a plurality of maximum rate of delivery of telecommunications contacts during a message delivery phase of the selected campaign;

an administrative input system configured to allow the campaign manager to set the maximum rate of delivery of telecommunications contacts during the message delivery phase of the selected campaign; and a rate of delivery component of the call throttling module configured to regulate a rate of delivery of telecommunications contacts when a number of network intercepts reaches an unacceptable number, wherein upon activation of the emergency notification campaign, telecommunications contacts generated by the emergency notification campaign are configured to be delivered at a rate that maximizes the rate of emergency notification contact delivery without disrupting the normal operation of the telecommunication system targeted for the campaign.

9. The system of claim 8, wherein the telecommunications contacts generated by the emergency notification campaign are configured to be delivered at a rate of one or more of about 25 contacts per 3 minute period, 50 contacts per 3 minute period, 100 contacts per 3 minute period, and 1000 contacts per 3 minute period.

10. The system of claim 9, wherein the telecommunications contacts generated by the emergency notification campaign are configured to be delivered at a rate of one or more of no greater than about 25 contacts per 3 minute period, 50 contacts per 3 minute period, 100 contacts per 3 minute period, and 1000 contacts per 3 minute period.

11. The system of claim 8, wherein the telecommunications contacts are delivered such that when the rate of network intercepts is greater than about 10%, and the system is configured to reduce the call delivery rate by about 25%.

12. The system of claim 11, wherein a reset call delivery rate is reanalyzed every 10 seconds to determine a new call delivery rate.

13. The system of claim 8 wherein the call delivery rate is determined according to an algorithm approximating Where OR 0.1=NIR/TC If NIR/TC is >0.30, then CDRa=0.5(CDRi);

If NIR/TC is <0.30>0.1, then CDRa=0.25(CDRi);

If NIR/TC is <0.1, then CDRa=1.25(CDRi).

14. The system of claim 13, wherein an additional factor of urgency adjustment is included.

15. The system of claim 8, wherein an alternative emergency notification message is configured to be delivered to the identifiable group of contacts excluded from the emergency notification campaign to remain in place rather than to evacuate.

16. The system of claim 8, wherein the alternative emergency notification message is configured to direct the identifiable group of contacts excluded from the emergency notification campaign to remain in place rather than to evacuate.

17. A system for emergency notification call delivery, comprising:

a campaign administrative interface comprising a contacts selection module, a contacts database, and a message delivery criteria system, the campaign administrative interface configured to allow an administrator to select contacts from the contacts database and distribute an emergency notification based on criteria the administrator selects from the message delivery criteria system;

a message delivery dependent system configured to allow selection based upon a destination geographic location;

a telecommunications interface system configured to facilitate the delivery of messages to a variety of telecommunications systems; and an identifiable group of contacts present in the contact database that are to be excluded from the emergency notification, wherein the emergency notification is configured to be delivered over the telecommunications system to a group of message recipients selected from the contacts database according to the selected criteria in a geographic area and the identifiable group of contacts in the geographic area are excluded from the emergency notification campaign.

18. The system of claim 17, wherein an alternative emergency notification message is configured to be to the identifiable group of contacts excluded from the emergency notification campaign.

19. The system of claim 18, wherein the alternative emergency notification message criteria are configured to direct the identifiable group of contacts excluded from emergency notification campaign to remain in place rather than to evacuate.

20. The system of claim 18, wherein the contacts database is a public safety telephone database, and the geographic area excluded is a single address.

\* \* \* \* \*